(12) United States Patent
L'Heureux et al.

(10) Patent No.: US 10,371,596 B2
(45) Date of Patent: Aug. 6, 2019

(54) TESTING FIBER ARRANGEMENT IN MULTI-FIBER CABLES

(71) Applicant: EXFO INC., Quebec (CA)

(72) Inventors: Mario L'Heureux, Levis (CA); Stephane Perron, Levis (CA); Michel Leclerc, Quebec (CA)

(73) Assignee: EXFO Inc., Quebec, Quebec (CA)

( * ) Notice: Subject to any disclaimer, the term of this patent is extended or adjusted under 35 U.S.C. 154(b) by 152 days.

(21) Appl. No.: 14/820,864

(22) Filed: Aug. 7, 2015

(65) Prior Publication Data

US 2016/0041065 A1     Feb. 11, 2016

Related U.S. Application Data

(60) Provisional application No. 62/034,533, filed on Aug. 7, 2014.

(51) Int. Cl.
*G01M 11/00* (2006.01)

(52) U.S. Cl.
CPC .... *G01M 11/3136* (2013.01); *G01M 11/3154* (2013.01)

(58) Field of Classification Search
CPC ............ G01M 11/3136; G01M 11/3154
See application file for complete search history.

(56) References Cited

U.S. PATENT DOCUMENTS

| | | |
|---|---|---|
| 5,621,829 A | 4/1997 | Ford |
| 7,349,605 B2 | 3/2008 | Noonan et al. |
| 7,565,055 B2 | 7/2009 | Lu et al. |
| 8,036,504 B2 | 10/2011 | Lu |
| 8,041,178 B2 | 10/2011 | Lu et al. |
| 8,417,114 B1 | 4/2013 | Storey et al. |
| 8,670,110 B2 | 3/2014 | Schillab et al. |
| 9,110,249 B2 | 8/2015 | Kewitsch |
| 9,435,713 B2 | 9/2016 | Collier et al. |
| 2003/0210850 A1 | 11/2003 | DeAngelis |
| 2007/0086694 A1 | 4/2007 | Murphy |

(Continued)

FOREIGN PATENT DOCUMENTS

WO     2013181197     12/2013

OTHER PUBLICATIONS

Unknown, "Section 4—Performance Metrics and Administration" in "Data Center Design Guide", LAN-1160-EN, Nov. 2010, p. 49-67, published by Corning Cable Systems, USA.

(Continued)

*Primary Examiner* — Shawn Decenzo
*Assistant Examiner* — Rufus L Phillips
(74) *Attorney, Agent, or Firm* — Helene Chotard

(57) ABSTRACT

There is provided a method and a system for identifying or verifying the fiber arrangement and/or the cable type of multi-fiber array cables (such as MPO cables) which employs an OTDR acquisition device at the near end of the MPO cable, a loopback device at the far end and an array of signatures detectable by the OTDR, either at the far or the near end. The loopback device allows performing bidirectional OTDR measurements with a single OTDR acquisition device (without moving it from one end to the other) and the signature array provides fiber arrangement/cable type identification or verification.

8 Claims, 12 Drawing Sheets

(56) References Cited

U.S. PATENT DOCUMENTS

| | | | |
|---|---|---|---|
| 2007/0115456 A1* | 5/2007 | Wisseman | H04B 10/00 356/73.1 |
| 2013/0194566 A1 | 8/2013 | Schell et al. | |
| 2013/0301036 A1* | 11/2013 | Schillab | G01M 11/3154 356/73.1 |
| 2015/0124246 A1* | 5/2015 | Collier | G01M 11/3136 356/73.1 |
| 2016/0349145 A1 | 12/2016 | Irving | |

OTHER PUBLICATIONS

Unknown, "Plug & Play Systems with Multi-Fiber Connectors: Polarity Explained", AEN 069, Rev. 9, May 2010, p. 1-7, published by Corning Cable Systems, USA.

Third Party Submission under 37 C.F.R. 1.290 dated Jan. 23, 2018; U.S. Appl. No. 15/427,474, filed Feb. 8, 2017; Applicant: EXFO Inc.

* cited by examiner

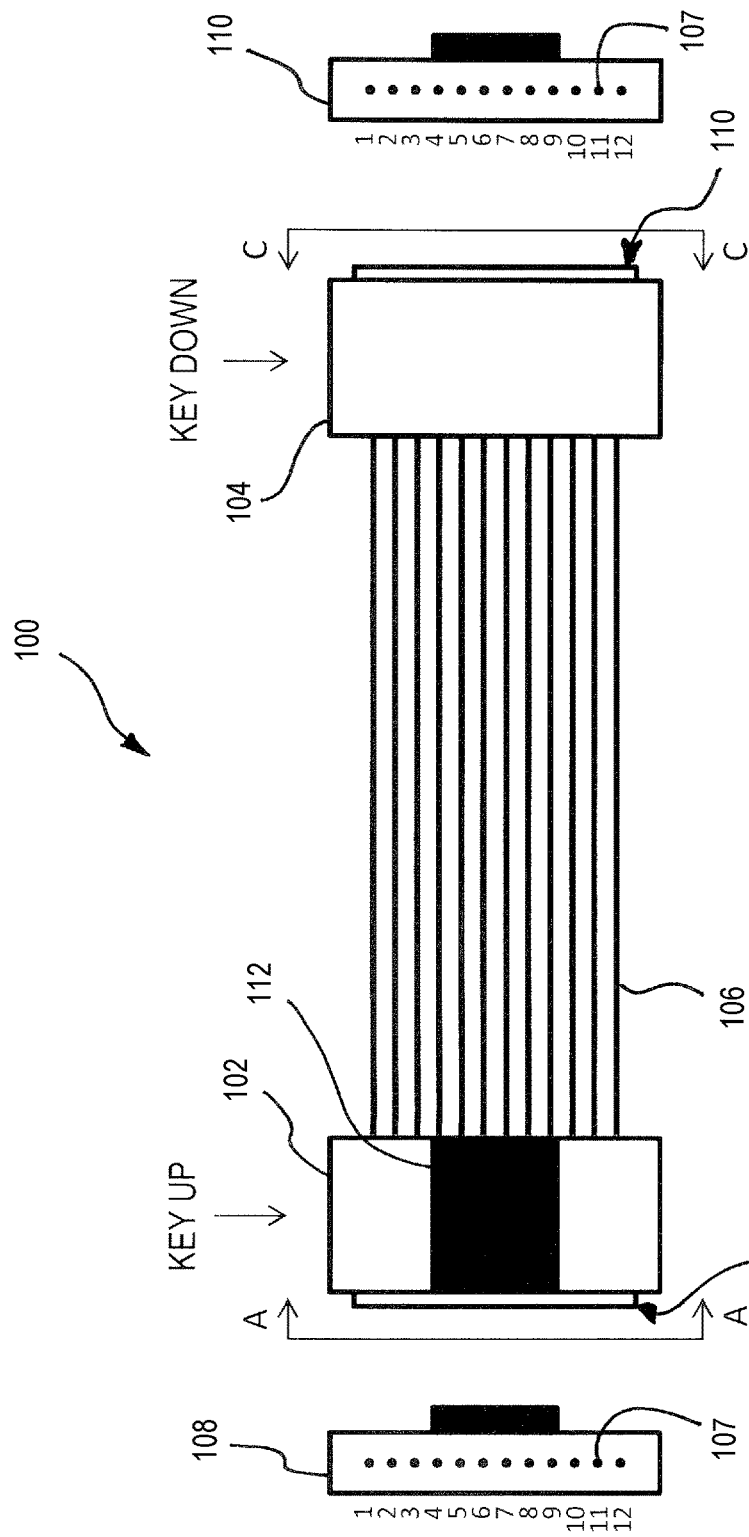

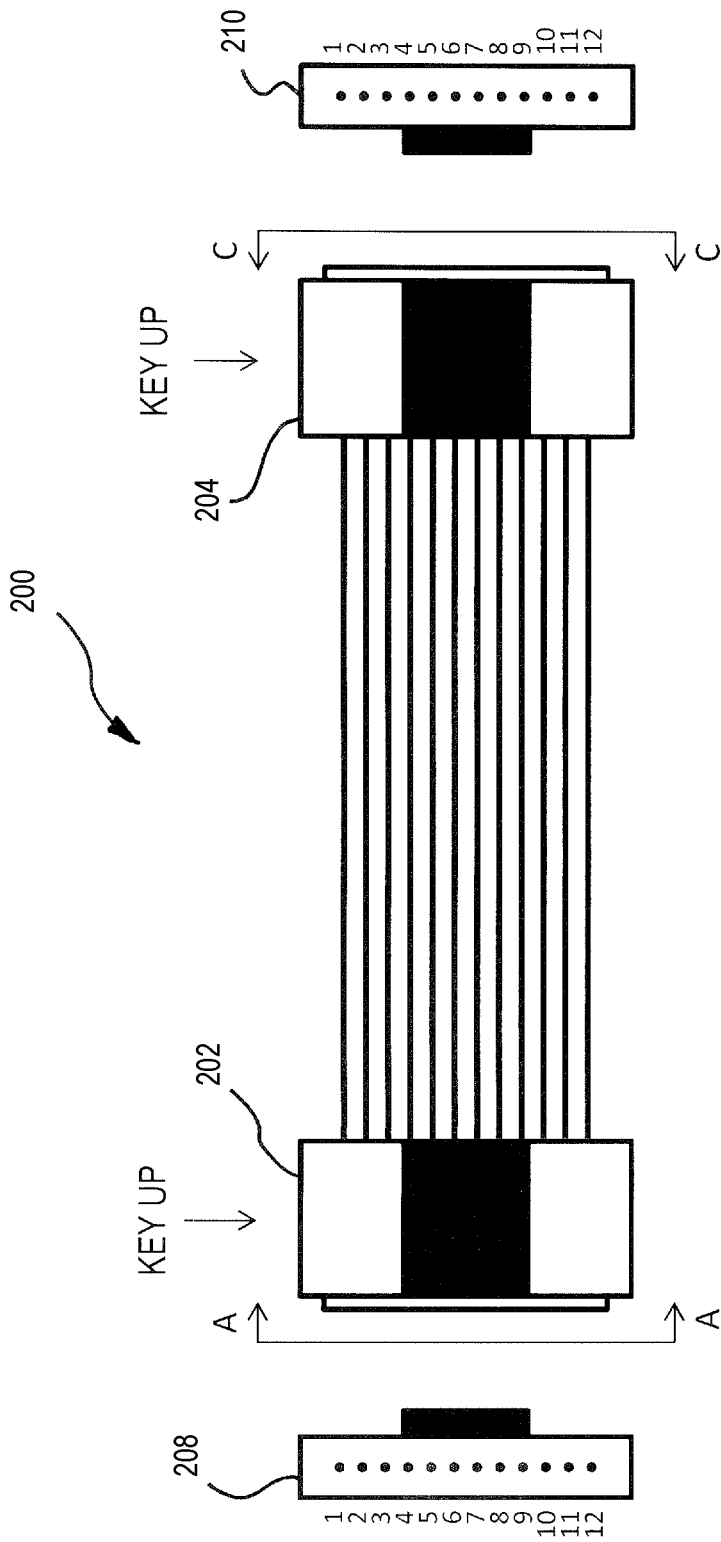

| Type A Cable KI / no PT | | Type B Cable no KI / no PT | | Type C Cable KI / PT | | B+C Cables no KI / PT | |
|---|---|---|---|---|---|---|---|
| 1 | AL | 1 | AL | 1 | AD | 1 | AJ |
| 2 | BC | 2 | BI | 2 | BK | 2 | BK |
| 3 | CB | 3 | CF | 3 | CL | 3 | CH |
| 4 | DK | 4 | DG | 4 | DA | 4 | DE |
| 5 | EH | 5 | EH | 5 | EJ | 5 | ED |
| 6 | FI | 6 | FC | 6 | FG | 6 | FG |
| 7 | GJ | 7 | GD | 7 | GF | 7 | GF |
| 8 | HE | 8 | HE | 8 | HI | 8 | HC |
| 9 | IF | 9 | IB | 9 | IH | 9 | IL |
| 10 | JG | 10 | JK | 10 | JE | 10 | JA |
| 11 | KD | 11 | KJ | 11 | KB | 11 | KB |
| 12 | LA | 12 | LA | 12 | LC | 12 | LI |

| Type A Cable KI / no PT | | Type B Cable no KI / no PT | | Type C Cable KI / PT | | B+C Cables no KI / PT | |
|---|---|---|---|---|---|---|---|
| 1 | AL | 1 | AL | 1 | AH | 1 | AJ |
| 2 | BG | 2 | BI | 2 | BK | 2 | BK |
| 3 | CJ | 3 | CJ | 3 | CL | 3 | CH |
| 4 | DK | 4 | DG | 4 | DI | 4 | DI |
| 5 | EH | 5 | EH | 5 | EJ | 5 | EL |
| 6 | FI | 6 | FK | 6 | FG | 6 | FG |
| 7 | GB | 7 | GD | 7 | GF | 7 | GF |
| 8 | HE | 8 | HE | 8 | HA | 8 | HC |
| 9 | IF | 9 | IB | 9 | ID | 9 | ID |
| 10 | JC | 10 | JC | 10 | JE | 10 | JA |
| 11 | KD | 11 | KF | 11 | KB | 11 | KB |
| 12 | LA | 12 | LA | 12 | LC | 12 | LE |

TESTING FIBER ARRANGEMENT IN MULTI-FIBER CABLES

CROSS-REFERENCE TO RELATED APPLICATIONS

This application claims priority under 35 USC § 119(e) of U.S. provisional patent application 62/034,533 filed Aug. 7, 2014; the specification of which is hereby incorporated by reference.

TECHNICAL FIELD

The invention relates to the characterization of multi-fiber array cables and more specifically to identifying or verifying the fiber arrangement of a multi-fiber array cable using optical time-domain reflectometry.

BACKGROUND OF THE ART

Optical reflectometric methods are widely employed for characterization of optical fiber links. Among these methods, the most commonly used approach is Optical Time-Domain Reflectometry (OTDR—also used to refer to the corresponding device), a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test can be characterized.

Multi-fiber array cables are widely employed nowadays in premises optical fiber cabling such as in data centers and other intrabuilding optical fiber networks, which require high connectivity density and versatile solutions. Multi-fiber array cables are mostly interconnected and connected to optical network equipment using MPO/MTP® connectors (MPO being the acronym for Multi-fiber Push-On/Pull-Off connectors and MTP a brand name). The most common MPO/MTP® connectors are configured in a 1×12 fiber array but 2×12 and 2×16 fiber arrays as well as other configurations are also possible.

Multi-fiber array cables are also commonly employed in combination with duplex optical cabling and optical fiber transition modules in premises optical fiber cabling. Multi-fiber array cabling may be arranged in duplex or parallel configurations. In a duplex multi-fiber array configuration, the optical fibers are arranged on the multi-fiber connectors such that on pairs of adjacent optical fibers, one fiber is used for transmitting and the other for receiving. Transmission and reception fibers therefore alternate on the connector. In a parallel multi-fiber array configuration, optical fibers used for transmitting and that used for receiving are physically separated into two groups of adjacent fibers on the multi-fiber array connectors. The position of receiving and transmitting optical fibers at a multi-fiber connector defines what is referred to in the industry as the polarity. Array system connectivity requires specific combinations of duplex patch cords, multi-fiber array cables and optical fiber transition modules in order to properly manage polarities in duplex or parallel configurations. The TIA/EIA-568-C.3 Standard conveniently defines guidelines for maintaining fiber polarity in array systems. Because various multi-fiber array configurations are possible (i.e. duplex configuration, one-plug parallel configuration, two-plug one-row parallel configuration and one-plug two-row configuration, see TIA/EIA-568-C.3), various multi-fiber array cable types are defined by the TIA/EIA-568-C.3 Standard, each having a specific 1×12 or 2×12 fiber arrangement. Type A, Type B and Type C (1×12) multi-fiber array cables as defined by the Standard are illustrated in FIGS. 1, 2 and 3 respectively. Type A cables as defined by the Standard are designed with a key inversion but no duplex pair twists between the input and output connectors. Type B cables are designed with no key inversion and no duplex pair twists. Type C cables are designed with a key inversion and with duplex pair twists. In one array systems, combinations of different cable types may be required depending on the multi-fiber array configuration employed. Hence, deployment mistakes can easily occur if the appropriate arrangement of cable types is not followed (e.g. some cables are mixed up) which result in improper fiber polarity at the multi-fiber array connections.

In order to attempt to prevent polarity mistakes, Corning™ has introduced a proprietary Universal Polarity Management Method that employs multi-fiber array cables at both ends of which a proprietary optical fiber transition module is connected. The same optical fiber transition module may be used at both ends. This proprietary optical fiber transition module allows polarity to be properly managed without duplex inversions either on duplex patchcords (see Method A as defined in the TIA/EIA-568-C.3 Standard) or within the multi-fiber array cable (Type C cables), and this irrespective of the deployed multi-fiber array configuration (i.e. duplex vs parallel configuration). But even when employing the Universal Polarity Management Method by Corning™, deployment mistakes may arise if the wrong cable types or optical fiber transition modules are installed.

Of course, other proprietary or custom multi-fiber array cabling systems may be used and may require characterization.

Characterization of optical fiber cabling is required to test network integrity and performance. Tier 1 characterization of multi-fiber array connections includes insertion loss measurements, cable length determination and fiber arrangement/cable type verification. These measurements may be performed with an Optical Loss Test Set (OLTS), but OLTS measurements are not sufficient for Tier 2 testing which, in addition to encompassing those measurement associated with Tier 1 testing, further require a complete characterization of the various elements along a fiber link. This complete characterization includes connector location, loss and reflection, splice location, loss and reflection, length and insertion loss of individual segments, as well as additional events that may cause insertion loss such as an unwanted optical fiber bend. OTDR measurements are therefore required for Tier 2 testing.

In order to properly characterize splice or other connection losses using OTDR measurements in an optical fiber link that may include concatenated singlemode optical fibers segments, the Telecommunications Industry Association (TIA) recommends the use of bi-directional OTDR analysis. Such analysis averages the results of single-ended OTDR measurements acquired in both directions of the fiber link under test (test procedure EIA/TIA FOTP-61 "Measurement of Fiber or Cable Attenuation Using an OTDR"), thereby removing ambiguities associated with single-end OTDR measurements. Small differences in fiber geometry between the different concatenated fiber segments in a link may induce small changes in the backscattering characteristics. As a consequence, this geometry mismatch between spliced or otherwise connected fibers may cause an apparent "gain" or a drop in the backscattered light of OTDR measurements, which introduces a bias in the insertion loss measurement.

For example, a fiber connection may appear as a gain in the backscattered light due to a mismatch between the connected fibers. An OTDR measurement performed from the opposite end on the same fiber connection would conversely result in an overestimation of the connection loss. For this reason, the precision obtained with single-end OTDR measurements may not always be sufficient for Tier 1 and/or Tier 2 testing requiring characterization of optical fiber connections and/or overall insertion loss. The Telecommunications Industry Association (TIA) therefore recommends the use of bi-directional OTDR analysis to properly characterize optical fiber links. Bidirectional OTDR measurement also provides unambiguous continuity check.

OTDR methods exist for verifying the fiber arrangement/cable type of multi-fiber array cables (see for example WO 2013/181197 A1 to Collier et al.) but in order to perform bidirectional OTDR analysis with these methods, either two OTDR acquisition devices should be used, i.e. one at each end of the link under test, or a single OTDR acquisition device should be moved from one end to the other.

SUMMARY

It is an object of the present invention to provide a method and a system for identifying or verifying the fiber arrangement/cable type of multi-fiber array cables or cable links which addresses at least some of the above concerns.

In accordance with one aspect, there is provided a method and system for identifying or verifying the fiber arrangement and/or the cable type of multi-fiber array cables (such as MPO cables) which employs an OTDR acquisition device at the near end of the MPO cable, a loopback device at the far end and an array of signatures detectable by the OTDR, either at the far or the near end. The loopback device allows performing bidirectional OTDR measurements with a single OTDR acquisition device (without moving it from one end to the other) and the signature array provides fiber arrangement/cable type identification or verification.

In one embodiment, an optical switch is coupled to the OTDR acquisition device and is controllable to successively direct the OTDR test signal to each fiber of the MPO cable. This further allows bidirectional OTDR measurements on all fibers of the MPO cable with no reconnection by the user (a single connection step is required in order to perform bidirectional OTDR measurements on all fibers of the MPO cable).

Different loopback and signature arrangements are possible.

In one embodiment, the signature array is installed at the far end of the MPO cable and the signature array is such that the signatures as detectable by the OTDR acquisition device will be different depending on the direction in which the OTDR test signal traverses the loopback. This allows for polarity testing (duplex pair twists) and key inversion identification and thereby discrimination between Type A, Type B, Type C MPO cables. Other fiber arrangements on MPO cables may also be identified.

In another embodiment, the signature may be either at the near end or at the far end of the MPO cable and if at the far end, there is no need for the signature to be direction dependent (different length of loopback could serve as signatures). In this case, in order to allow duplex pair twist verification and hence discrimination between Type A and Type C cables, the loopback device is such that at least two optical fiber loops each couple optical fiber ports that do not pertain to a same pair of an inclusive set of distinct pairs of adjacent optical fiber ports (referred to hereinafter as "duplex pairs". Otherwise, the same signature would appear on the OTDR trace, irrespective of the presence of duplex pair twists, e.g. whether a Type A or Type C cable is tested. Similarly, the loopback device is such that the loopback arrangement is also not mirror symmetric relative to a transverse line of symmetry of the optical fiber port arrangement (i.e. the center of the fiber row) in order to allow identification of key inversions and hence discrimination between Type A and Type B cables. By recognizing signatures on OTDR acquisitions performed sequentially on the multiple fibers of the near-end connector, it is possible to identify duplex pair twists and key inversions (and therefore the fiber arrangement) of the MPO cable link without ambiguity.

In all the above-mentioned embodiments, if OTDR acquisitions are performed at the near end of two fibers that are looped back together, a bidirectional OTDR analysis may be provided for each of the two corresponding fiber links. Once the fiber arrangement is determined, knowing that the loopback arrangement is predetermined, it is possible to identify which fiber of the MPO cable corresponds to the second half of the OTDR trace, and then appropriately pair OTDR acquisitions performed at different front fiber ports in order to achieve bidirectional OTDR analysis. The bidirectional OTDR analysis hence provides a complete characterization of the various elements along individual optical fiber. Furthermore, in certain cases, it may also provide insertion loss measurements on each individual optical fiber of the MPO cable.

The cable length may also be determined from the OTDR acquisitions and the characterization of the MPO cable is then complete. In this case, Tier 2 testing may be completed using only bidirectional OTDR measurements (i.e. without any need for OLTS measurement) and Tier 1 and Tier 2 testing of multi-fiber array cable links can be performed with a single test instrument.

In accordance with a first aspect of the invention, there is provided an optical reflectometry system for identifying a fiber arrangement in a multi-fiber cable link comprising a plurality of optical fiber links each connected between a front multi-fiber connector, at a near end of said cable link, and an end multi-fiber connector, at a far end, according to said fiber arrangement. The system comprises:

an optical reflectometry acquisition device to be coupled to said cable link at said near end for performing optical reflectometry acquisitions to a plurality of said optical fiber links;

a loopback device to be coupled to said cable link at said far end and comprising optical fiber loops coupling each of the optical fiber ports of the end multi-fiber connector to another of its optical fiber ports; and an array of signatures to be coupled to said cable link at one of said far end and said near end and comprising optical fiber paths to be coupled to said optical fiber links, respectively, at least two said optical fiber paths each having a corresponding optical signature thereon, the optical signatures being detectable and mutually-distinguishable by said optical reflectometry system.

In one embodiment, the optical reflectometry system further comprises an optical switch coupled to said optical reflectometry acquisition device and controllable to successively direct a test signal produced by said optical reflectometry acquisition device toward said plurality of said optical fiber links at said front multi-fiber connector.

In one embodiment, the signature array is coupled to the far end of the cable link and each signature as detectable by the optical reflectometry acquisition device is dependent upon the direction in which the test signal propagates in the corresponding optical fiber path. In another embodiment, the signatures are not required to be direction-dependent even if the signature array is coupled to the far end of the cable link but in this case, at least two optical fiber loops of the loopback device each couple optical fiber ports that do not pertain to the same duplex pair (i.e. distinct pairs of longitudinally adjacent optical fiber ports, corresponding to duplex pairs in the case of a duplex multi-fiber array configuration). These test configurations allow for polarity verification and discrimination between Type A, Type B and Type C cables without ambiguity.

In principle, in order for the discrimination between Type A, Type B and Type C to be non-ambiguous, it is sufficient to have only one OTDR-detectable signature in the signature array (i.e. there could be only one port with a detectable signature and all other ports with no detectable signature). However, in practice, the signature array may have a larger number of unique signatures for redundancy. In some embodiments, the signature array has an optical path for each fiber of the multi-fiber cable and each optical path has a unique signature.

In one embodiment, the signature array is coupled to the near end of the cable link and, at least two optical fiber loops of the loopback device each couple optical fiber ports that do not pertain to the same duplex pair (i.e. distinct pairs of longitudinally adjacent optical fiber ports, corresponding to functional duplex pairs in the case of a duplex multi-fiber array configuration) and said at least two optical fiber loops do not couple optical ports of the same two pairs. This test configuration allows for polarity verification and discrimination between Type A and Type C cables without ambiguity. In principle, in order for the discrimination between Type A and Type C to be non-ambiguous, it is sufficient to have a only two loopbacks that complies with the above rules. However, in practice, these rules may be applied to more loopbacks for redundancy. In some embodiments, these rules are applied to all loopbacks.

In a further embodiment, a loopback arrangement is further not mirror symmetric relative to a transverse line of symmetry of an optical fiber port arrangement of the end multi-fiber connector. This further test configuration allows for discrimination between Type A, Type B and Type C cables without ambiguity. Again, in principle, in order to obtain non-ambiguous discrimination between Type A and Type B cables, it is sufficient to have a single loopback that complies with the rule of not looping symmetrically relative to the center of a fiber row at the connector array. However, in practice, this rule may be applied to more than one loopback for redundancy. In some embodiments, this rule is applied to all loopbacks.

In a further embodiment, the optical reflectometry acquisition device, the optical switch and the signature array are integrated and interconnected in a portable test instrument. The intergration minimizes the risk of user connection errors and also minimizes wear of connectors resulting from repeated connection and disconnection of optical components together. The most expensive parts of the optical reflectometry system (i.e. the optical reflectometry acquisition device, the optical switch and the signature array) are then permanently connected inside the portable test instrument, which prevents the optical connectors interconnecting these parts from wear due to connections and disconnections.

In one embodiment, the fiber arrangement at the cable connectors is in a 1×12 array.

In another embodiment, the fiber arrangement at the cable connectors is in a 2×12 array.

Of course, the optical fiber links within the tested multi-fiber array cable link may be either singlemode or multimode.

In accordance with second aspect of the invention, there is provided an optical reflectometry method for identifying a fiber arrangement in a multi-fiber cable link comprising a plurality of optical fiber links each connected between a front multi-fiber connector, at a near end of said cable link, and an end multi-fiber connector, at a far end, according to said fiber arrangement. The method comprises:

launching optical reflectometry acquisitions toward a plurality of said optical fiber links;

detecting at least one optical signature of an array of signatures coupled to said cable link at one of said far end and said near end on at least two of said optical reflectometry acquisitions; and identifying a fiber arrangement in said multi-fiber cable link from the detected signature in said optical reflectometry acquisitions, from a characterization of a loopback arrangement of a loopback device coupled to said cable link at said far end and from a characterization of said array of signatures.

In accordance with third aspect of the invention, there is provided a non-transitory computer readable storage medium having stored thereon computer-readable instructions that, when executed by a computer, cause the computer to perform the method of the second aspect.

In accordance with fourth aspect of the invention, there is provided an optical loopback device for use in identifying a fiber arrangement in a multi-fiber cable link. The loopback device comprises:

an input multi-fiber connector comprising a plurality optical fiber ports; and optical fiber loops coupling each of the optical fiber ports of the input multi-fiber connector to another of its optical fiber ports;

wherein at least two optical fiber loops of said loopback device each couple optical fiber ports that do not pertain to the same pair of an inclusive set of distinct pairs of adjacent ones of said optical fiber ports.

In accordance with fifth aspect of the invention, there is a provided test instrument for identifying a fiber arrangement in a multi-fiber cable link comprising a number of optical fiber links each connected between a front multi-fiber connector, at a near end of said cable link, and an end multi-fiber connector, at a far end, according to said fiber arrangement, the test instrument being for use with a loopback to be coupled to said cable link at said far end and comprising optical fiber loops arranged to couple each of the optical fiber ports of the end multi-fiber connector to another of its optical fiber ports, the test instrument comprising:

an optical reflectometry acquisition device to be coupled toward said cable link at said near end for performing optical reflectometry acquisitions toward a plurality of said optical fiber links;

an optical switch coupled to said optical reflectometry acquisition device and controllable to successively direct a test signal produced by said optical reflectometry acquisition device toward said plurality of said optical fiber links; and an array of signatures coupled at one end to said optical switch and at the other end toward the output of the test instrument for coupling to said cable link and comprising at least two optical fiber paths each having an optical signature thereon, the optical signatures being detectable and mutually-distinguishable by said optical reflectometry system.

Although MPO cables and connectors and patch cord cables are referred to throughout this document, it will be understood that the methods and systems described herein equivalently applies to other multi-fiber array conventions and that the MPO convention is herein employed as an illustrative example because of its wide presence in the datacenter and intrabuilding fiber cable industry.

Multi-fiber array cables are typically configured in a duplex multi-fiber array configuration or in a parallel multi-fiber array configuration. In a duplex configuration, transmitting and receiving fibers alternate longitudinally on the multi-fiber array (e.g. Rx Tx Rx Tx Rx Tx Rx Tx Rx Tx Rx Tx), whereas in a parallel configuration, transmitting and receiving fibers are distinctly grouped. In this case, transmitting and receiving fibers may either be arranged in two groups on a same multi-fiber array cable (e.g. Rx Rx Rx Rx Rx Rx Tx Tx Tx Tx Tx Tx) or separated on distinct multi-fiber array cables (i.e. one cable for the Rx fibers and another cable for the Tx fibers). In practice, the actual configuration of the system is not generally known when testing multi-fiber array cables. Hence, in the present specification, optical fiber ports of any multi-fiber array connector will be conceptually arranged in an inclusive set of distinct pairs of longitudinally adjacent optical fiber ports (1,2; 3,4; 5,6; 7,8; 9,10; 11,12) which will be referred to as "duplex pairs", irrespective of the actual configuration employed in the multi-fiber system.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed. In the case of conventional OTDR, measurements corresponding to different spatial resolutions may be obtained by varying the pulsewidth of the test light pulses, whereas in the case of OFDR, different spatial resolutions may be obtained by varying the frequency chirp of the OFDR test light signal. In the case of coded or correlation OTDR, it is the bit rate of the optical test pattern that determines the spatial resolution of the measurement.

BRIEF DESCRIPTION OF THE DRAWINGS

Further features and exemplary advantages of the present invention will become apparent to the skilled person from the following detailed description, taken in conjunction with the appended drawings, in which:

FIGS. 1A, 1B and 1C (prior art) are schematics illustrating a 1×12 multi-fiber array cable of the Type A as defined by the TIA/EIA-568-C.3 Standard, wherein FIG. 1A is a schematic near-end view of the multi-fiber array cable showing the front multi-fiber connector, FIG. 1B is a schematic top view of the multi-fiber array cable, and FIG. 1C is a schematic far-end view of the multi-fiber array cable showing the end multi-fiber connector;

FIGS. 2A, 2B and 2C (prior art) are schematics illustrating a 1×12 multi-fiber array cable of the Type B as defined by the TIA/EIA-568-C.3 Standard, wherein FIG. 2A is a schematic near-end view of the multi-fiber array cable showing the front multi-fiber connector, FIG. 2B is a schematic top view of the multi-fiber array cable, and FIG. 2C is a schematic far-end view of the multi-fiber array cable showing the end multi-fiber connector;

FIGS. 3A, 3B and 3C (prior art) are schematics illustrating a 1×12 multi-fiber array cable of the Type C as defined by the TIA/EIA-568-C.3 Standard, wherein FIG. 3A is a schematic near-end view of the multi-fiber array cable showing the front multi-fiber connector, FIG. 3B is a schematic top view of the multi-fiber array cable, and FIG. 3C is a schematic far-end view of the multi-fiber array cable showing the end multi-fiber connector;

It will be noted that throughout the appended drawings, like features are identified by like reference numerals.

Figures 3A, 3B, 3C:
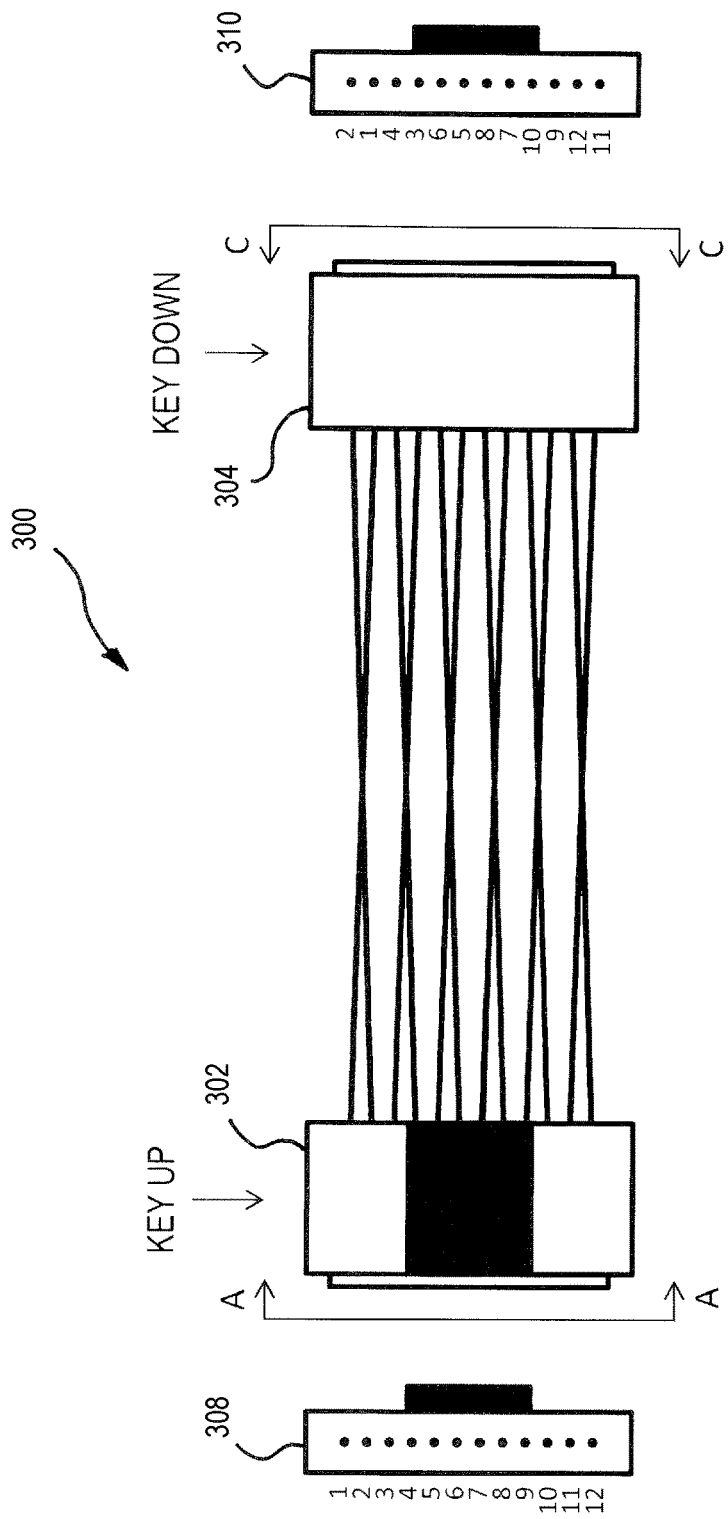

It should also be understood that when the appended drawings are denoted as schematics, elements of the drawings are not necessarily drawn to scale. Some mechanical or other physical components may also be omitted in order to not unduly encumber the figures.

DETAILED DESCRIPTION

Now referring to the drawings, FIGS. 1A, 1B and 1C illustrate a 1×12 multi-fiber array cable 100 of the Type A as defined by the TIA/EIA-568-C.3 Standard. Although this is not shown on the figure, the cables defined by this Standard actually employ Multi-fiber Push-On/Pull-Off (MPO) connectors and will be referred to herein as MPO cables. An MPO cable 100 has a front multi-fiber (MPO) connector 102 at a near end of the cable 100 and an end multi-fiber (MPO) connector 104 at a far end. A plurality of optical fibers 106 (in this case 12) are connected between the front and end connectors 102, 104. More specifically, respective opposite ends of each fiber 106 terminate at optical fiber ports 107 on the front and the end MPO connectors 102, 104. Each MPO connector 102, 104 has a predefined physical shape as provided by the TIA/EIA-568-0.3 Standard for compatibility with the other components in the industry. This shape includes a key 112 which is in the form of a protrusion on one side of the connector and which serves to set the orientation in which the connector may be inserted in a corresponding receiving socket (such as that of MPO adapters). As can be seen from FIG. 1B, in a Type A cable there is a key inversion between the front connector 102 and the end connector 104 (when the optical fibers lie flat on a surface): the key 112 is up on the front connector 102 and down on the end connector 104 (or vice-versa). Accordingly, when looking at the end surface 108 of the front connector 102 with the key 112 disposed upwardly, fibers no. 1 to 12 are arranged from left to right (see FIG. 1A). Similarly, when looking at the end surface 110 of the end connector 102 with the key 112 disposed upwardly, fibers no. 1 to 12 are also arranged from left to right (see FIG. 1C).

FIGS. 2A, 2B and 2C illustrate a 1×12 MPO cable 200 of the Type B as defined by the TIA/EIA-568-C.3 Standard. Type B cables are very similar to Type A cables and like features will therefore not be repeatedly described. As can be seen from FIG. 2B, in a Type B cable there is a no key inversion between the front connector 202 and the end connector 204 (when the optical fibers lie flat on a surface): when the key is up on the front connector 202 it is also up on the end connector 204. Accordingly, when looking at the end surface 208 of the front connector 202 with the key disposed upwardly, fibers no. 1 to 12 are arranged from left to right, whereas when looking at the end surface 210 of the end connector 202 the order of the fibers is inverted such that, when the key disposed upwardly, fibers no. 1 to 12 are arranged from right to left.

Knowing that in duplex multi-fiber array configurations, the receiving optical fibers are generally associated with odd-numbered optical fibers ports (1, 3, 5, 7, 9, 11) and the transmitting optical fibers associated with even-numbered optical fibers ports (2, 4, 6, 8, 10, 12), mistakenly installing a Type B cable instead of a Type A cable in a duplex multi-fiber array configuration would result in a fiber polarity inversion at the end connector. Moreover, knowing that in one-row parallel multi-fiber array configurations, the transmitting optical fibers are generally associated with the first half of consecutive optical fibers ports (1 to 6) and receiving optical fibers with the second half of consecutive optical fibers ports (7 to 12) or vice-versa, mistakenly installing a Type B cable instead of a Type A cable in a one-row parallel multi-fiber array configuration would also result in a fiber polarity inversion at the end connector FIGS. 3A, 3B and 3C illustrate a 1×12 MPO cable 300 of the Type C as defined by the TIA/EIA-568-C.3 Standard. Type C cables are also very similar to Type A cables and like features will therefore not be repeatedly described. As can be seen from FIG. 3B, as in a Type A cable, in a Type C cable there is a key inversion between the front connector 302 and the end connector 304 (when the optical fibers lie flat on a surface): when the key is up on the front connector 202 it down on the end connector 204. However, duplex pairs are crossed over in what is referred to herein as duplex pair twists, i.e. optical fiber ports 1, 3, 5, 7, 9, 11 on the front connector 302 are respectively linked to optical fiber ports 2, 4, 6, 8, 10, 12 on the end connector 304 and vice-versa. Accordingly, when looking at the end surface 308 of the front connector 302 with the key disposed upwardly, fibers no. 1 to 12 are arranged from left to right, whereas when looking at the end surface 310 of the end connector 302 with the key disposed upwardly, the sequence of the fibers at the optical fiber ports is 2, 1, 4, 3, 6, 5, 8, 7, 10, 9, 12, 11. As a consequence, mistakenly installing a Type C cable instead of a Type A cable in a duplex multi-fiber array configuration would result in a fiber polarity inversion at the end connector. Similarly, mistakenly installing a Type C cable instead of a Type B cable in a one-row parallel multi-fiber array configuration would also result in a fiber polarity inversion at the end connector.

In summary, Type A cables as defined by the Standard are designed with a key inversion but no duplex pair twists between the front and end connectors. Type B cables are designed with no key inversion and no duplex pair twists. Type C cables are designed with a key inversion and with duplex pair twists.

Test System

Figure 4:
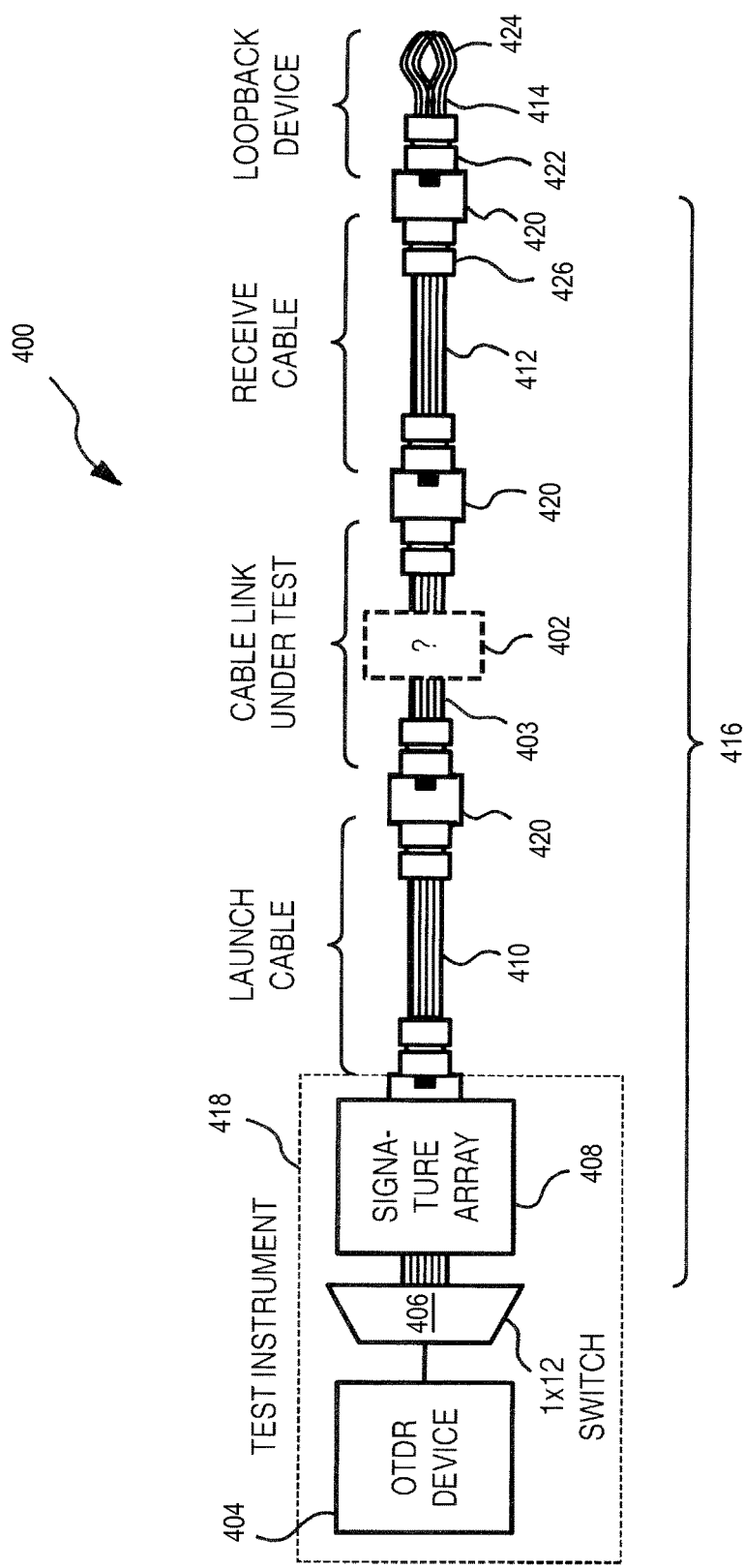
FIG. 4 is a schematic illustrating an optical reflectometry system for identifying a fiber arrangement in a multi-fiber cable link, in accordance with one embodiment in which the signature array is disposed at the near end of the tested cable link.

FIG. 4 shows an embodiment of an optical reflectometry system, and more specifically in this case an OTDR system 400, for identifying a fiber arrangement in a 1×12 MPO cable link 402 comprising a plurality (in this case 1×12) of optical fiber links 403. This embodiment employs a signature array disposed at the near end of the cable link under test 402. The OTDR system 400 comprises an optical reflectometry acquisition device, in this case an OTDR acquisition device 402, a 1×12 optical switch 406 directly coupled to the output of the OTDR acquisition device 402, a signature array 408 directly coupled to the output of the optical switch 406, a launch cable 410 to be connected between the signature array 408 and the near end of the MPO cable link under test 402, a receive cable 412 and a loopback device 414, the receive cable 412 to be connected between the far end of the MPO cable link under test 402 and the loopback device 414.

OTDR is a diagnostic technique for optical fiber links where a test signal in the form of light pulses is launched in the fiber link under test and the return light signal, arising from backscattering and reflections along the fiber link, is detected and analyzed. Various events along the fiber link can be detected and characterized through a proper analysis of the return signal in the time domain. The acquired power level of the return signal as a function of time is referred to as the OTDR trace, where the time scale is representative of distance between the OTDR acquisition device and a point along the fiber link. As known in the art, OTDR acquisitions are typically performed with launch and receive cables respectively connected to the near and the far ends of the fiber link in order to allow total loss characterization of the link. In order to undertake a bi-directional characterization, single-end OTDR measurements should be performed in both forward and backward directions on the fiber link. For singlemode cable links, identification and characterization of events and optical fiber segments along the fiber link is obtained by a proper analysis of the forward and backward-direction OTDR acquisitions. The events are typically characterized in terms of location, insertion loss and reflectance parameters while optical fiber segments may be characterized in terms of length and attenuation parameters. Such analysis may be useful for fiber link diagnosis and provides the necessary characterization for Tier 2 testing which requires a complete characterization of the various elements along each fiber link, including connector location, loss and reflection, splice location, loss and reflection, length and insertion loss of individual segments, as well as additional events that may cause insertion loss such as an unwanted optical fiber bend.

When the OTDR system 400 is connected to the cable link under test 402, the combination of the signature array 408, the launch cable 410, the cable link under test 402 and the receive cable 412 defines a plurality (in this case 1×12) of optical fiber links 416 on which OTDR acquisitions are to be performed. Of course, each of the signature array 408, the launch cable 410, the cable link under test 402 and the receive cable 412 have 1×12 optical fiber paths between their respective input and output ends. In order to undertake bi-directional characterizations of each optical fiber links 403 of the cable link under test 402, a forward and backward OTDR acquisition should be performed on each of the plurality of optical fiber links 416.

The OTDR acquisition device 404 comprises conventional optical hardware and electronics as known in the art for performing OTDR acquisitions on an optical fiber link. The OTDR acquisition device 404 is to be coupled to the cable link 402 at what is referred to herein as the near end. However, it should be understood that the near and far ends of the cable link under test 402 are only defined in relative to the location of the OTDR acquisition device 404 and that the OTDR acquisition device 404 may actually be coupled to any end of the cable link 402. The OTDR acquisition device 404 is employed to perform OTDR acquisitions toward at least one but typically all the optical fiber links 403 of the tested cable link 402 in order to test each link.

In this embodiment, the OTDR acquisition device 404 has a single optical output. In order to perform OTDR acquisitions on a plurality of optical fiber links 403 of the cable link 402, the 1×12 optical switch 406 is coupled at the output of the OTDR acquisition device 402 and is controllable to successively direct the test signal to the plurality of optical fiber links 403. Of course, in order to allow OTDR acquisitions, the optical switch 406 should be bidirectional. It should be noted that, instead of using an optical switch, an operator could manually and successively connect the OTDR acquisition device 402 to a plurality of optical fiber ports, by following or not instructions given by a user interface. Of course, other redirecting means may also be envisaged.

In this embodiment, the OTDR acquisition device 404, the optical switch 406 and the signature array 408 are integrated together in a portable test instrument 418. The 1×12 optical inputs of the signature array 408 are respectively connected in the test instrument 418 to the 1×12 optical outputs of the optical switch 406. The optical interconnection may be made, for instance, through an MPO cable although other options may be envisaged. It is still noted that the OTDR acquisition device 404, the optical switch 406 and the signature array 408 could instead be provided separately for the test operator to interconnect them for performing characterization of the cable link under test 402.

The signature array 408 comprises a plurality (in this case 1×12) of optical fiber paths between its input and its output MPO connectors/adaptors. At least one of the optical fiber paths has an optical signature thereon that is detectable by the OTDR acquisition device (i.e. by an analysis of the acquired OTDR traces). More specifically, there may be only one optical fiber paths with a detectable signature and all other ports with no detectable signature. That being said, in practice, the signature array 408 may have a larger number of unique signatures for redundancy. In some embodiments, such as the one of FIG. 5A described hereinafter, the 1×12 optical fiber paths of the signature array 408 all have mutually-distinguishable signatures such that each signature is unique. The signature array 408 is described in more detail hereinafter with reference to FIG. 5A.

The launch cable 410 and the receive cable 412 are MPO cables of predetermined lengths which are chosen among other things as a function of the overall length and the expected insertion loss of the tested cable link 402. For example, when employing best in class OTDR devices for testing premises optical fiber cabling shorter than 300 m or so and having insertion loss lower than 3 dB, the length of launch and receive cables may be of 10 to 25 m or so. Longer launch and receive cables may be required in presence of high reflectance (>−45 dB), higher link loss or length, or if OTDR performances are limited (e.g. longer dead zones, less dynamic range). Longer launch and receive cables are also needed for testing Wide Area Network (WAN) telecommunication links. In this embodiment, the launch cable 410 and the receive cable 412 are Type A cables and the launch cable 410, the cable link under test 402, the receive cable 412 and the loopback device 414 are interconnected using Type A (key-up-key-down) MPO adapters 420. It should be understood that a different convention may be used as long as it is so predetermined or characterized before test measurements are undertaken.

The loopback device 414 comprises an MPO connector 422 having a plurality (in this case 1×12) of optical fiber ports and a plurality of optical fiber loops 424 that couples each of the optical fiber ports to another of the optical fiber ports. It will be understood that the loopback device 414 may be enclosed in a casing (not shown) further comprising an input MPO adaptor to which the receive cable 412 is to be connected in order to mate the MPO connector 422 of the loopback device 414 with the output MPO connector 426 of the receive cable 412. The loopback device 414, including possible loopback arrangements, is described in more detail hereinafter with reference to FIGS. 6, 7 and 8.

It is noted that the different components of the OTDR system 400, namely the test instrument 418, the launch cable 410, the receive cable 412 and the loopback device 414 are typically sold separately and meant to be connected by an operator according to a predetermined test method.

One skilled in the art will appreciate that in the OTDR system 400 of FIG. 4, the optical fibers are looped back in pairs in order to allow for bi-directional characterization using OTDR measurements performed from one end only of the cable link under test 402. Of course, more than two optical fibers could be looped back and forth using a loopback device at the near end in addition to the loopback device at the far end (such that the multiple fibers of the cable link are daisy chained). However, it should be understood that such more loopbacks would require the OTDR test signal to travel over a longer optical distance in order to reach all the looped back fibers. Longer pulses would then be needed with a drawback on resolution, which also implies longer launch and receive cables and signature array. Keeping the number of looped back fibers to the minimum number (i.e. two) allows for bi-directional OTDR characterization using acquisitions undertaken from one end only of the cable link under test 402 while minimizing the optical distance over which the OTDR acquisitions need to be performed and thereby allowing acquisitions using relatively short pulsewidths, as well as relatively short launch and receive cables and signature array.

Signature Array

Figure 5A:
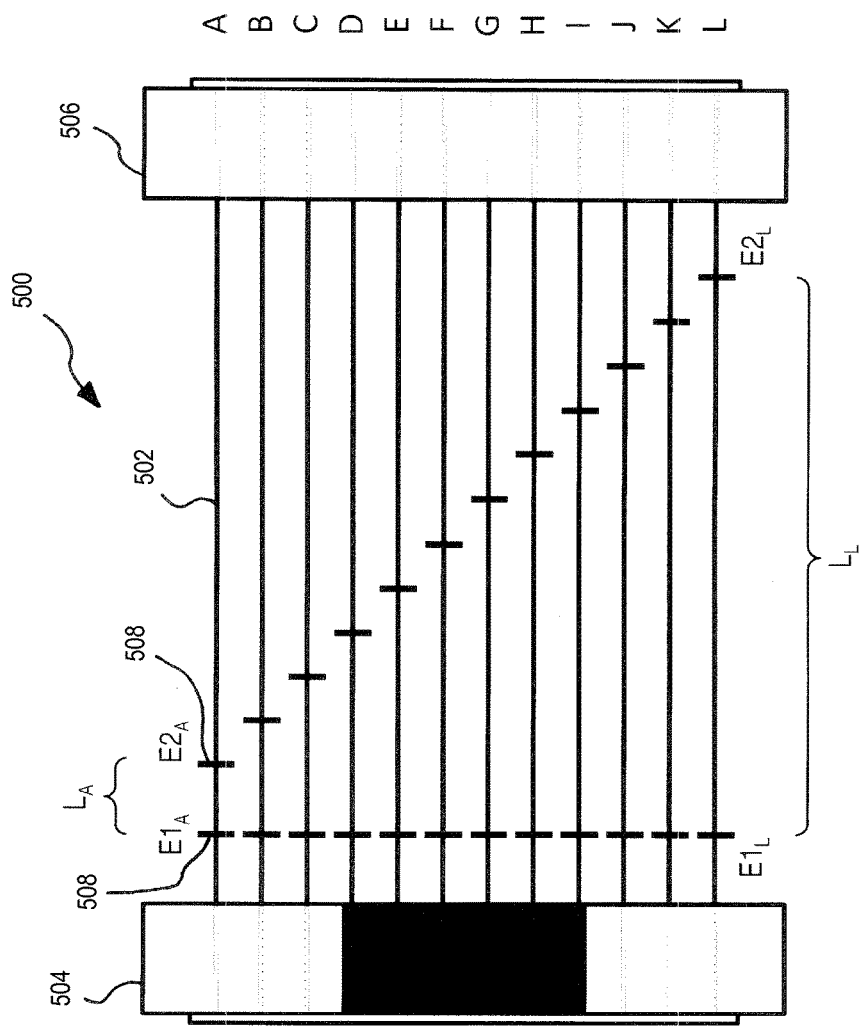
FIG. 5A is a schematic illustrating a signature array to be used in the optical reflectometry system of FIG. 4 in accordance with a first embodiment employing angled polished physical contact (e.g. FC/APC) input and output MPO connectors.

FIG. 5A illustrates a first embodiment 500 of the signature array 408 to be employed in the OTDR system 400 of FIG. 4. The signature array 500 is similar to an MPO cable (in this case a Type A cable) and comprises a plurality (in this case 1×12) of optical fiber paths 502 between an input MPO connector 504 and an output MPO connector 506. In this embodiment, all the optical fiber paths 502 have substantially the same overall lengths. However, optical signatures are introduced on each of the optical fiber paths 502. Because repeated connections and disconnections of non-angled polished physical contact connectors (e.g. FC/PC connectors) may be the cause of excessive insertion loss and reflectance at the interconnection, angled polished physical contact connectors (e.g. FC/APC connectors) are generally more reliable for use at interconnections that may be frequently disconnected. For this reason, this embodiment employs angled polished physical contact at this input and output MPO connectors 502, 504. The signatures are generated by event features $E1_X$, $E2_X$ (where X stands for A through L) disposed along the optical fiber paths 502. The event features $E1_X$, $E2_X$ are features that are detectable on acquired OTDR traces by generating distinct events such as reflective events. Non-angle polished physical contact connections 508 (such as a FC/PC connector) are introduced on each optical fiber path 502 to produce event features $E1_X$ and $E2_X$. The signatures are defined by the mutually-distinct optical distance between event features $E1_X$, $E2_X$ associated with a corresponding optical fiber path 502. In this case, two event features ($E1_X$, $E2_X$) are present on each optical fiber path 502. The optical distance $L_X$ between event feature $E1_X$ and event feature $E2_X$ is unique for each signature. A signature X is therefore defined by optical distances $L_X$, where X stands for any of the signatures A to L.

For example, in this embodiment, the optical signatures may be defined according to the following table:

TABLE 1

Optical signatures of the signature array 500 of FIG. 5A

| Signature | L (m) |
|---|---|
| A | 10 |
| B | 12 |
| C | 14 |
| D | 16 |
| E | 18 |
| F | 20 |
| G | 22 |

TABLE 1-continued

Optical signatures of the signature array 500 of FIG. 5A

| Signature | L (m) |
|---|---|
| H | 24 |
| I | 26 |
| J | 28 |
| K | 30 |
| L | 32 |

With this embodiment, a signature may be recognized on an OTDR trace by identifying, at a position along the OTDR trace that is consistent with the position of the signature array 500 along the OTDR system 400 in which it is employed, two reflective events that are mutually spaced by optical distances $L_X$ defining the recognized signature.

Figure 5B:
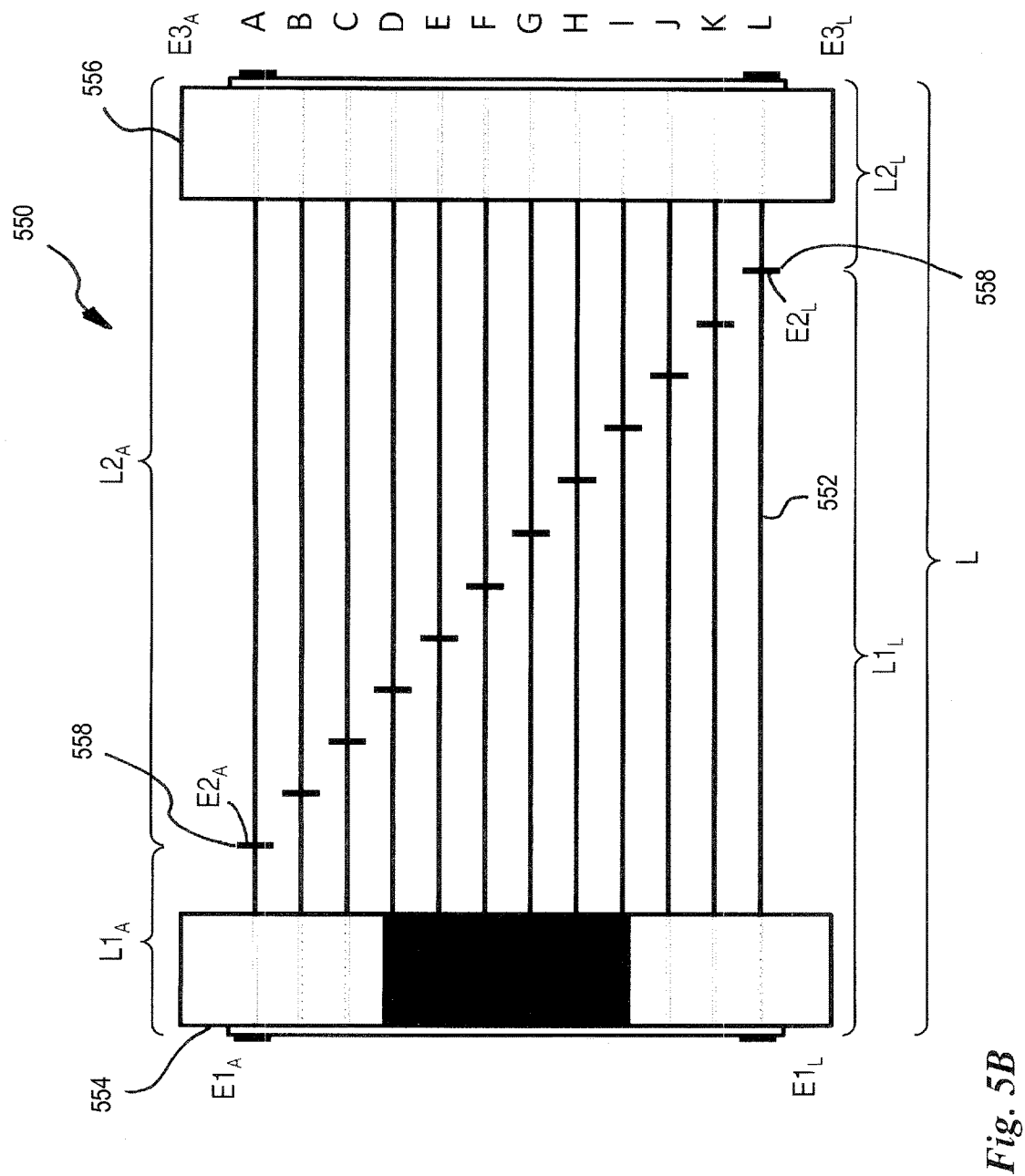
FIG. 5B is a schematic illustrating another signature array to be used in the optical reflectometry system of FIG. 4 in accordance with a second embodiment employing non-angled polished physical contact (e.g. FC/PC) input and output MPO connectors.

FIG. 5B illustrates a second embodiment 550 of the signature array 408 to be employed in the OTDR system 400 of FIG. 4. Again, the signature array 550 is similar to an MPO cable (again in this case a Type A cable) and comprises a plurality (again in this case 1×12) of optical fiber paths 552 between an input MPO connector 554 and an output MPO connector 556. Optical signatures are introduced on each of the optical fiber paths 552. The signatures are generated by event features $E1_X$, $E2_X$, $E3_X$ (where X stands for A through L) along the optical fiber paths 502. In this embodiment, non-angled polished physical contact connectors (e.g. FC/PC connectors) are employed at the input and output MPO connectors 554, 556. Accordingly, the optical fiber junction at the input MPO connector 554 (when it is connected in the OTDR system 400 of FIG. 4) introduces event features $E1_X$ ($E1_A$ to $E1_L$) and the optical fiber junction at the output MPO connector 556 introduces event features $E3_X$ ($E3_A$ to $E3_L$). In addition, a non-angle polished physical contact connector 554 (such as a FC/PC connector) is introduced on each optical fiber path 552 to produce event features $E2_X$ ($E2_A$ to $E2_L$). The signatures are defined by the mutually-distinct optical distance between event features associated with a corresponding optical fiber path. In this case, three event features ($E1_X$, $E2_X$ and $E3_X$) are present on each optical fiber path. The optical distance L between event feature $E1_X$ and event feature $E3_X$ is substantially the same for all the signatures and serves as a reference to more reliably identify a signature on the OTDR traces. The optical distance $L1_X$ between event feature $E1_X$ and event feature $E2_X$ is unique for each unique signature. It follows that the optical distance $L2_X$ between event feature $E2_X$ and event feature $E3_X$ is also unique for each unique signature, which creates redundancy useful for unambiguous identification of a signature on the OTDR traces. A signature X is therefore defined by optical distances $L1_X$ and $L2_X$, where X stands for any of the signatures A to L.

For example, in this embodiment, the optical signatures are defined according to the following table:

TABLE 2

Optical signatures of the signature array 550 of FIG. 5B

| Signature | L1 (m) | L2 (m) | L (m) |
|---|---|---|---|
| A | 10 | 31 | 41 |
| B | 12 | 29 | 41 |
| C | 14 | 27 | 41 |
| D | 16 | 25 | 41 |
| E | 18 | 23 | 41 |
| F | 20 | 21 | 41 |

TABLE 2-continued

Optical signatures of the signature array 550 of FIG. 5B

| Signature | L1 (m) | L2 (m) | L (m) |
|---|---|---|---|
| G | 22 | 19 | 41 |
| H | 24 | 17 | 41 |
| I | 26 | 15 | 41 |
| J | 28 | 13 | 41 |
| K | 30 | 11 | 41 |
| L | 32 | 9 | 41 |

With this embodiment, a signature may be recognized on an OTDR trace by identifying three reflective events on the OTDR trace that are mutually spaced by optical distances $L1_X$ and $L2_X$ defining the recognized signature.

Of course, it will be understood that, similarly to the embodiment of FIG. 5A, the input and/or output MPO connectors 554, 556 of the embodiment 550 of FIG. 5B could be replaced by angled-polished physical contact (e.g. FC/APC connectors) and the corresponding event features $E1_X/E3_X$ be replaced by non-angle polished physical contact connectors (such as FC/PC connectors) inserted along the optical fiber paths 552 to produce the three event features ($E1_X$, $E2_X$ and $E3_X$) such that the optical distance L between event feature $E1_X$ and event feature $E3_X$ is the same for all the signatures.

It is also noted that if the signature array 500 of FIG. 5A is to be integrated inside test instrument (such as in the test instrument 418), event features $E1_X$ could be replaced by the use of a non-angled polished (e.g. FC/PC) at the input MPO connector 504.

It will be understood that other configurations of signature arrays may be used instead of the signature arrays 500, 550 of FIGS. 5A and 5B. For example, each signature may be defined by only two event features such that the optical distance between the two event features is unique for each signature. In one embodiment, the two event features may be introduced respectively by an input MPO connector and an output MPO connector, the length of the optical fibers between the input and the output MPO connectors being unique and distinguishable on an OTDR trace.

In yet another embodiment (not illustrated), only one event feature $E1_X$ (where X stands for A through L) is introduced on each optical fiber path 502 by a non-angled polished physical contact connection (e.g. FC/PC) and a second event feature $E0_X$ is provided by an OTDR detectable feature that is inherently present at the same position on all optical fiber links 416. Such a second event feature $E0_X$ may be generated, for instance, by the inherent optical return loss of the optical switch 406. Each signature X is then defined by the optical distance $L_X$ (where X stands for any of the signatures A to L) between event feature $E0_X$ and event feature $E1_X$.

In still another embodiment (not illustrated), the signature array 500 of FIG. 5A or the signature array 550 of FIG. 5B is actually employed also as a launch cable, thereby eliminating the need for a separate launch cable in the OTDR system 400 of FIG. 4.

In the signature arrays 500 and 550 of FIGS. 5A and 5B, each signature A to L is unique. As will be discussed hereinafter, it is however noted that in order to simply identify key inversions and duplex pair twists in the cable link under test 402 (see FIG. 4), it is not necessary that all the optical paths of the signature array 500/550 have a signature. It is even possible to find loopback configurations necessitating only one optical path to have a detectable signature. However, in this case, OTDR measurements need to be undertaken on at least four of the optical fiber links 416 (see FIG. 4) in order to properly identify key inversions and duplex pair twists.

Other optical configurations that may be used to make the signature array are described, for example, in U.S. Pat. No. 8,482,725 which is commonly owned by Applicant and hereby incorporated by reference (see FIGS. 3, 4 and 5 and the related description).

It is however noted that in order to allow OTDR characterization of the cable link under test 402 (see FIG. 4), the signature array should allow propagation of the OTDR test signal therethrough without compromising the OTDR measurements. Insertion loss should therefore generally be minimized.

Loopback Device

Figures 6A, 6B:
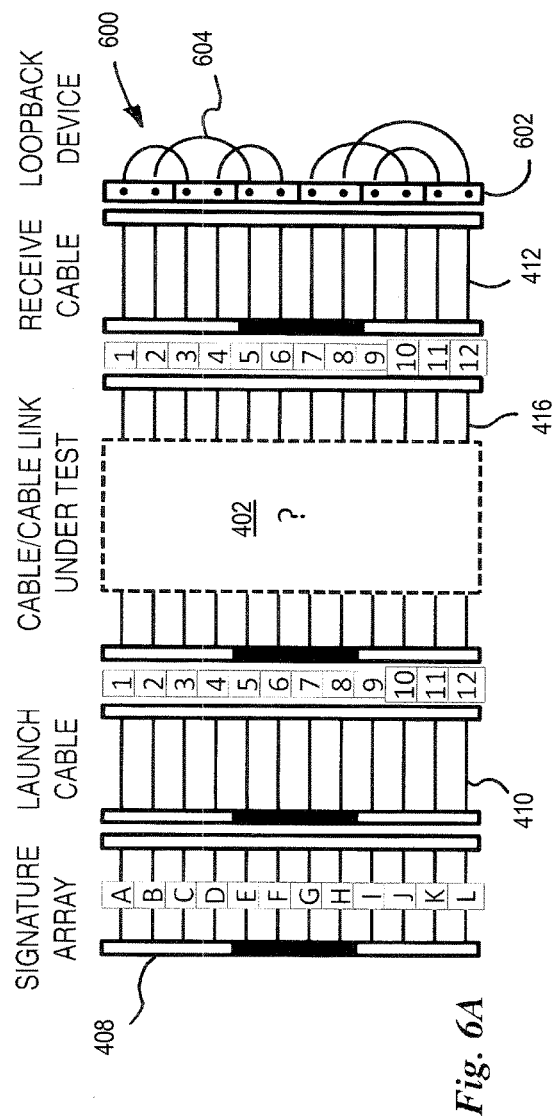
FIG. 6A is a schematic illustrating a first test configuration employing a loopback device in accordance with a first embodiment.
FIG. 6B is a table showing the combination of signatures corresponding to the first test configuration of FIG. 6A, as detectable on acquired OTDR traces for different types of cable link under test.

FIG. 6A schematically illustrates a first embodiment of a loopback device 600 and the corresponding test configuration comprising the signature array 408, the launch cable 410, the cable link under test 402, the receive cable 412 (see FIG. 4) and the loopback device 600. The combination of the signature array 408, the launch cable 410, the cable link under test 402 and the receive cable 412 defines a plurality (in this case 1×12) of optical fiber links 416 on which OTDR acquisitions are to be undertaken using the OTDR system 400 of FIG. 4. The loopback device 600 may be employed for example with the signature array 500 of FIG. 5A for testing a fiber arrangement of the cable link under test 402.

The loopback device 600 comprises an input MPO connector 602 and six loops 604 of optical fiber that each couple one port of the input MPO connector 602 to another. The length of the six loops are typically similar to that of launch and receive cables (i.e. about 10 to 25 m for testing "premises" optical fiber cabling shorter than 300 m or so and having insertion loss lower than 3 dB) and are also chosen among other things as a function of the overall length and the expected insertion loss of the tested cable link 402 in order to also allow the characterization of the input MPO connector 602 using the OTDR measurements. In this embodiment, port 1 is coupled back to port 3, port 2 is coupled back to port 5, port 4 is coupled back to port 6, port 7 is coupled back to port 10, port 8 is coupled back to port 12 and port 9 is coupled back to port 11, as shown in Table 3. Also, in this embodiment, the optical fiber loop 604 are of substantially equal length which makes it easier to segment an OTDR trace to identify which portion of it corresponds to the loopback device 600.

TABLE 3

Loopback configuration of loopback device 600 of FIG. 6A

| | |
|---|---|
| 1 | 3 |
| 2 | 5 |
| 3 | 1 |
| 4 | 6 |
| 5 | 2 |
| 6 | 4 |
| 7 | 10 |
| 8 | 12 |
| 9 | 11 |
| 10 | 7 |
| 11 | 9 |
| 12 | 8 |

FIG. 6B shows the corresponding combination of signatures as detectable on OTDR traces acquired from the plurality of optical fiber links 416, for different types of cable links under test. In order to properly identify or verify the cable type of the cable link under test 402, the OTDR system 400 (FIG. 4) should be able to identify without ambiguity any combinations of key inversions and duplex pair twists. It should be noted that concatenations of Type A, Type B and Type C MPO cables with Type A (key-up-key-down) and Type B (key-up-key-up) MPO adapters will result in four different types of overall cable link arrangements. It is generally not necessary to recognize each segment of the overall cable link under test 402, as every combination will generally be equivalent to either a Type A cable (key inversion/no pair twist), a Type B cable (no key inversion/no pair twist), a Type C cable (key inversion/pair twists) or a combination of a Type B cable, a Type A adaptor and a Type C cable (no key inversion/pair twists). It is therefore only necessary to identify key inversions and duplex pair twists. It is also noted that interchanging Type A and Type B adaptors will simply result in switching between a key inversion and no key inversion arrangements. For example, the concatenation of two Type A cables with a Type B adaptor (instead of a Type A adaptor) is equivalent to a Type B cable (no key inversion/no pair twist). The system may therefore identify a Type B cable when there was actually no Type B cable connected because the overall cable link under test is equivalent to a Type B cable.

FIG. 6B comprises four columns corresponding to the four possible fiber arrangements, respectively a Type A cable (key inversion/no pair twist), a Type B cable (no key inversion/no pair twist), a Type C cable (key inversion/pair twists) and the combination of a Type B cable, a Type A adaptor and a Type C cable (no key inversion/pair twists). Each column has a first sub-column indicating the optical fiber port on which an OTDR acquisition is undertaken and a second sub-column indicating the combination of signatures that would exhibit on the corresponding OTDR trace. As such, in the case of a Type A cable, when launching an OTDR acquisition on port 5 of the signature array 408, the OTDR trace will exhibit signature E on the near end portion of the OTDR trace and signature B on the far end portion. The OTDR trace may be segmented as follows, in this order: signature E of the signature array 408, fiber 5 of the launch cable 410, fiber 5 of the cable link under test 402, fiber 5 of the receive cable 412, loop from 5 to 2 of the loopback device 600, fiber 2 of the receive cable 412, fiber 2 of the cable link under test 402, fiber 2 of the launch cable 410 and signature B of the signature array 408. As can be seen in FIG. 6B, with this loopback configuration, a single OTDR acquisition launched on fiber 5, fiber 6, fiber 7 or fiber 8 provides unambiguously identification of the cable type, i.e. any combination of key inversions and duplex pair twists.

It should be noted that it is not necessary that a signature be present on all the optical fiber paths of the signature array 408 for unambiguous identification of the fiber arrangement using a single OTDR acquisition. For example, having signatures A, B and C only (and no signature on the other optical fiber paths) would allow unambiguous identification of the cable type using an OTDR acquisition performed on fiber 5.

It should also be observed that using the loopback device 600 with a signature array that would only have a signature on optical fiber path 5 (signature E), i.e. and no signature on the other optical fiber paths, would allow unambiguous identification of the cable type using OTDR acquisitions performed on fiber 1, 2, 3 and 4. However, in this case, it is not possible generally to obtain unambiguous identification of the cable type using a single OTDR acquisition. Up to three OTDR acquisitions (on fiber 1, 2, 3 or 4) may be needed to unambiguously identify the cable type.

It should be noted that, in order to allow duplex pair twists verification and hence discrimination between Type A and Type C cables, the loopback device 600 is designed such that fibers are not looped back with the other fiber of a same duplex pair. Otherwise, the same signature would appear on the OTDR trace, irrespective of the presence of duplex pair twists, e.g. whether a Type A or Type C cable is tested. Similarly, the loopback device 600 is also not mirror symmetric relative to a transverse line of symmetry of the fiber row (it is not horizontally symmetric in FIG. 6A), in order to allow identification of key inversions and hence discrimination between Type A and Type B cables.

Figures 7A, 7B:
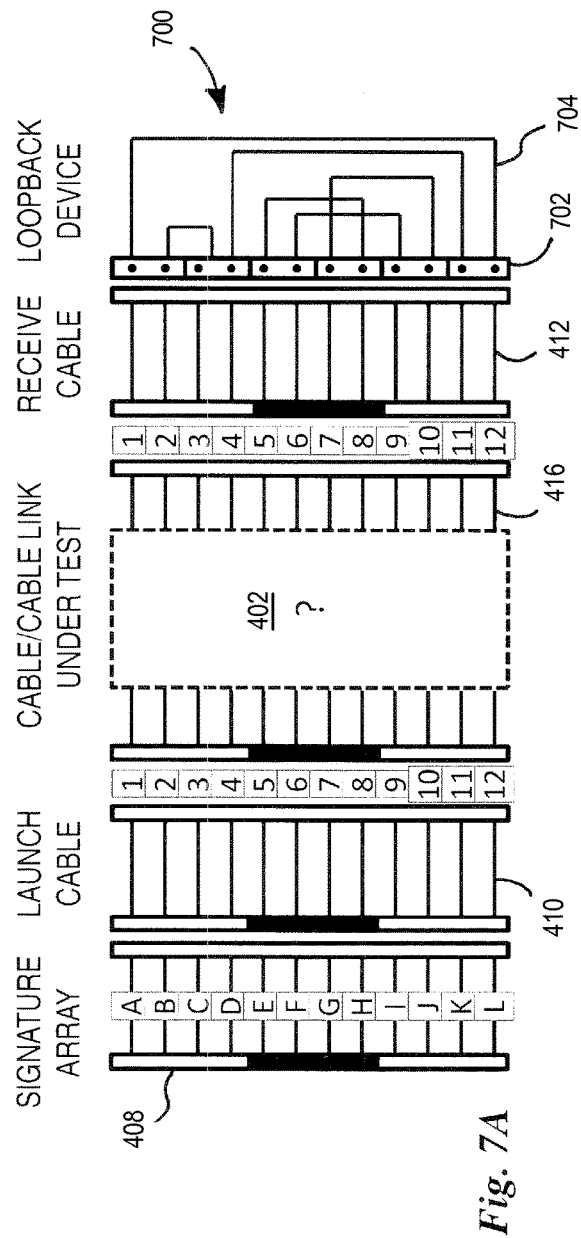
FIG. 7A is a schematic illustrating a second test configuration employing a loopback device in accordance with a second embodiment.
FIG. 7B is a table showing the combination of signatures corresponding to the second test configuration of FIG. 7A, as detectable on acquired OTDR traces for different types of cable link under test.

FIG. 7A schematically illustrates a second embodiment of a loopback device 700 and the corresponding test configuration comprising the signature array 408, the launch cable 410, the cable link under test 402, the receive cable 412 (see FIG. 4) and the loopback device 700. In this embodiment, port 1 is coupled back to port 12, port 2 is coupled back to port 3, port 4 is coupled back to port 11, port 5 is coupled back to port 8, port 6 is coupled back to port 9 and port 7 is coupled back to port 10, as shown in Table 4. In this embodiment, the optical fiber loops 604 are also of equal length.

TABLE 4

Loopback configuration of loopback device 700 of FIG. 7A

| | |
|---|---|
| 1 | 12 |
| 2 | 3 |
| 3 | 2 |
| 4 | 11 |
| 5 | 8 |
| 6 | 9 |
| 7 | 10 |
| 8 | 5 |
| 9 | 6 |
| 10 | 7 |
| 11 | 4 |
| 12 | 1 |

The plurality of optical fiber ports of the input MPO connector 702 of the loopback device 700 has alternating even- and odd-numbered optical fiber ports (corresponding to the alternating Rx and Tx polarities in the case of a duplex multi-fiber array configuration). In the embodiment of FIG. 7A, each optical fiber loop of the loopback device 700 couples an even optical fiber port to and odd optical fiber port (an Rx port is always coupled with a Tx port in the case of a duplex configuration).

FIG. 7B shows the corresponding combination of signatures as detectable on OTDR traces acquired from the plurality of optical fiber links 416, for the different possible fiber arrangements of the cable link under test 402. As can be seen in FIG. 7B, with this loopback configuration, a single OTDR acquisition launched on fiber 3, fiber 4, fiber 9 or fiber 10 provides unambiguous identification of the cable type, i.e. any combination of key inversions and duplex pair twists.

Figures 8A, 8B:
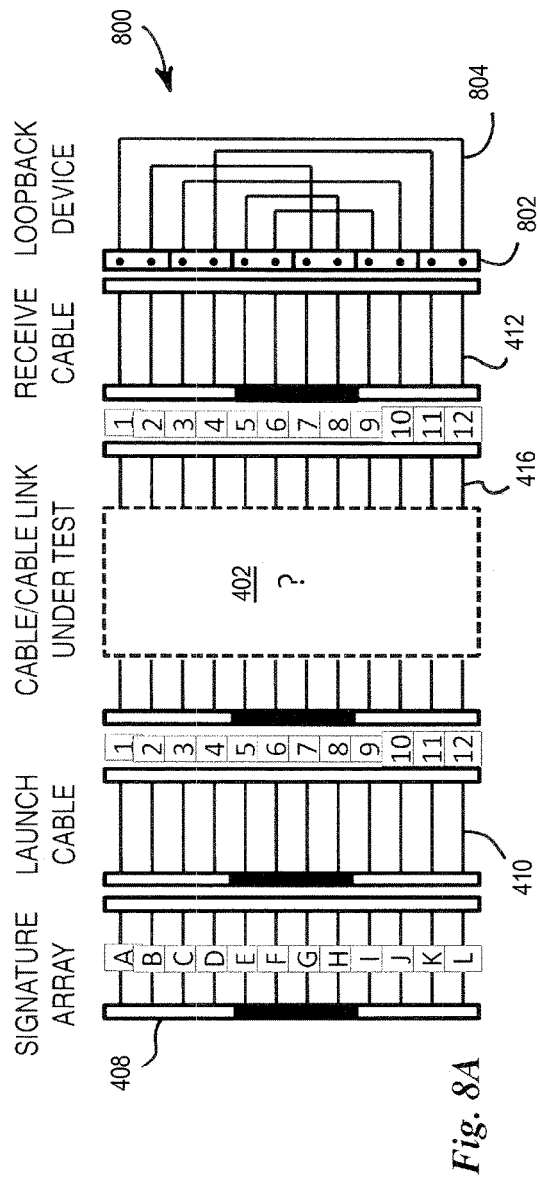
FIG. 8A is a schematic illustrating a third test configuration employing a loopback device in accordance with a third embodiment.
FIG. 8B is a table showing the combination of signatures corresponding to the third test configuration of FIG. 8A, as detectable on acquired OTDR traces for different types of cable link under test.

FIG. 8A schematically illustrates a third embodiment of a loopback device 800 and the corresponding test configuration comprising the signature array 408, the launch cable 410, the cable link under test 402, the receive cable 412 (see FIG. 4) and the loopback device 800. In this embodiment, port 1 is coupled back to port 12, port 2 is coupled back to port 7, port 4 is coupled back to port 11, port 5 is coupled back to port 8, port 6 is coupled back to port 9 and port 7 is coupled back to port 2, as shown in Table 5. In this embodiment, the optical fiber loops 804 are also of substantially equal length.

TABLE 5

Loopback configuration of loopback device 800 of FIG. 8A

| | |
|---|---|
| 1 | 12 |
| 2 | 7 |
| 3 | 10 |
| 4 | 11 |
| 5 | 8 |
| 6 | 9 |
| 7 | 2 |
| 8 | 5 |
| 9 | 6 |
| 10 | 3 |
| 11 | 4 |
| 12 | 1 |

The plurality of optical fiber ports of the input MPO connector 802 of the loopback device 800 may be conceptually split into a first and a second group of a same number of longitudinally adjacent optical fiber ports (ports 1-6 in a first group and ports 7-12 in a second group). In this embodiment, the optical fiber loops 804 of the loopback device 800 each couple an optical fiber port of the first group to an optical fiber port of the second group. In addition, in the embodiment of FIG. 8A, each optical fiber loop of the loopback device 800 couples an optical fiber port to and odd optical fiber port.

FIG. 8B shows the corresponding combination of signatures as detectable on OTDR traces acquired from the plurality of optical fiber links 416, for the different possible fiber arrangements of the cable link under test 402. As can be seen in FIG. 8B, with this loopback configuration, no single acquisition provides unambiguously identification of the cable type. In fact, at least two OTDR acquisitions, launched for instance on fiber 2 and fiber 8, are required. However, even though this configuration requires more analysis for unambiguously identification of the cable type, it is still a suitable one.

Test Instrument

Figure 9:
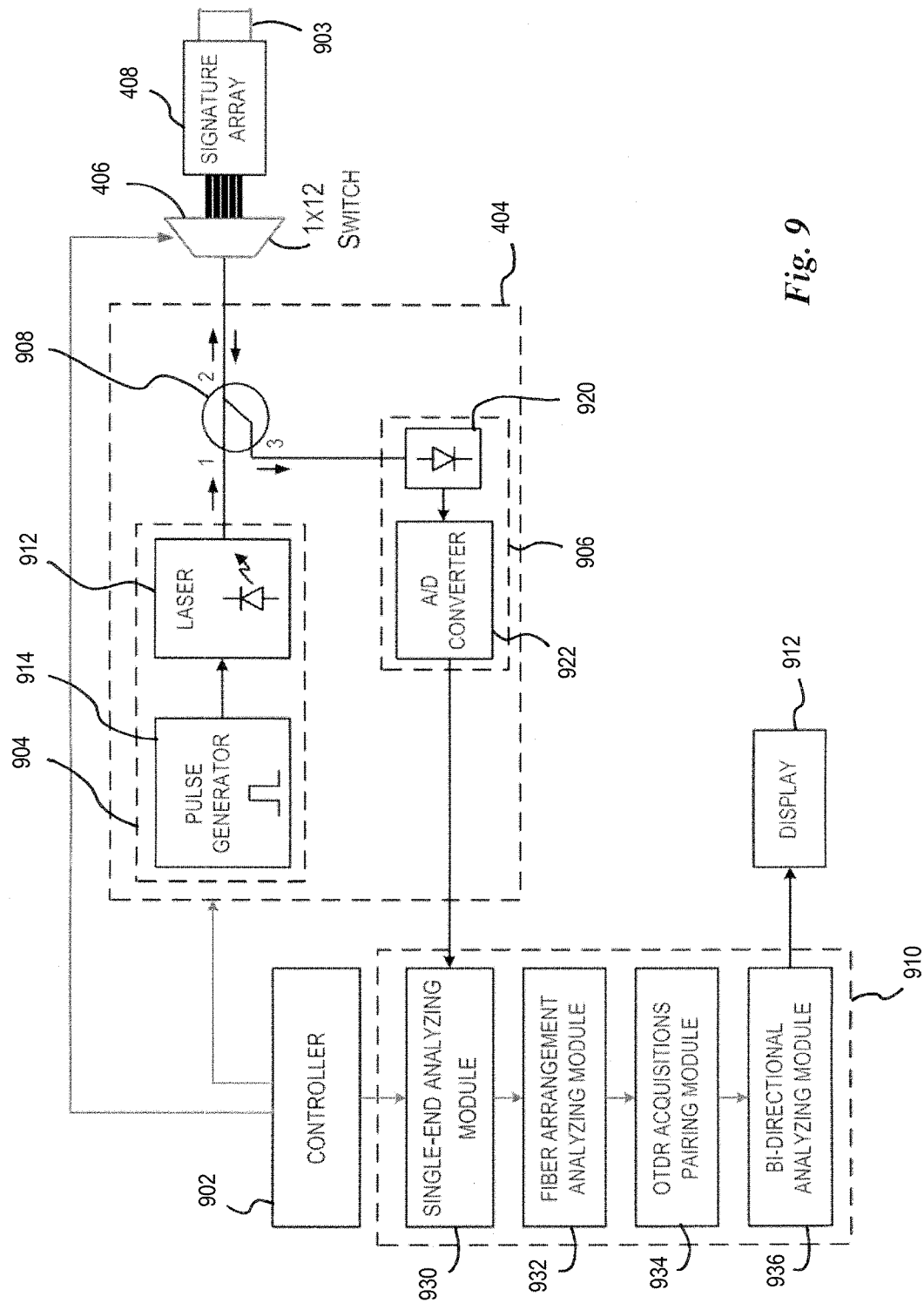
FIG. 9 is a block diagram illustrating in more detail the test instrument of the optical reflectometry system of FIG. 4, in accordance with one embodiment.

FIG. 9 illustrates the test instrument 418 of FIG. 4 in more detail. The test instrument 418 comprises the OTDR device 404, the optical switch 406, the signature array 418, a controller 902, an analyzing module 910, a display 911 and an output MPO adaptor 903 for connecting the test instrument 418 to the launch cable 410 (not shown).

The OTDR device 404 comprises a light generating assembly 904, a detection assembly 906, a directional coupler 908 and an analyzing module 910. The light generating assembly 904, the detection assembly 906 and the directional coupler 908 are generally embodied in the OTDR device 404, while the analyzing module 710 may be either integrated or partially integrated with the optical hardware including the OTDR device 404, the optical switch 406 and the signature array 408, or may be completely physically separate from the optical hardware. Similarly, as mentioned herebefore, in this embodiment the optical switch 406 and the signature array 408 are integrated in the test instrument 418. However, they could be provided as separate devices to be connected together for performing a fiber arrangement identification method.

The light generating assembly 904 is embodied by a laser 912 driven by a pulse generator 914 to generate the test signal comprising test light pulses having desired characteristics. As known in the art, the light generating assembly 904 is adapted to generate test light pulses of varied pulsewidths and optical power through a proper control of the pattern produced by the pulse generator 914. One skilled in the art will understand that it may be beneficial or required by the application to perform OTDR measurements at various different wavelengths. For this purpose, in some embodiments, the light generating assembly 904 is adapted to generate test light pulses having varied wavelengths by employing a laser 912 that is tunable for example. It will be understood that the light generating assembly 904 may combine both pulsewidth and wavelength controlling capabilities. Of course, different and/or additional components may be provided in the light generating assembly, such as modulators, lenses, mirrors, optical filters, wavelength selectors and the like.

The light generating assembly 904 is coupled to the output of the OTDR device 404 through a directional coupler 908, such as a circulator, having three or more ports. The first port is connected to the light generating assembly 904 to receive the test light pulses therefrom. The second port is connected to the output 916 of the OTDR device 404. The third port is connected to the detecting assembly 906. The connections are such that test light pulses generated by the light generating assembly 904 are coupled to the output of the OTDR device 404 and that the return light signal arising from backscattering and reflections along one of the optical fiber links 416 (see FIG. 4) is coupled to the detection assembly 906.

The detection assembly 906 comprises a light detector 920, such as an avalanche photodiode, which detects the return light signal corresponding to each test light pulse, and a converter 922 to convert the electrical signal proportional to the detected return light signal from analog to digital in order to allow processing by the OTDR trace analyzing module 910. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. An OTDR trace nominally corresponds to a single test light pulse but may also be obtained from averaging multiple acquisitions performed under the same conditions. Of course, the OTDR device 404 may also be used to perform multiple acquisitions with varied pulsewidths to obtain a multi-pulsewidth OTDR acquisition. The thereby obtained OTDR acquisitions will be typically stored in memory within the analyzing module 910 for further processing.

The controller 902 is used to control the acquisition conditions for each light acquisition, by controlling the light generating assembly 904 to generate test light pulses having variable pulsewidths, wavelengths and/or optical power, as well as to control the optical switch 406 in order to select toward which one of the optical fiber links 416 an OTDR acquisition is to be undertaken. It will however be understood that the controller 902 as well as the analyzing module 910 are typically implemented in a software comprising computer-readable instructions that are to be executed by a generic computer. The generic computer(s) executing analyzing module software may be integrated, partially integrated or physically separate from the optical hardware including the OTDR device 404, the optical switch 406 and the signature array 408.

The controller 902 controls parameters of the light generating assembly 904 according to parameters that are either provided by the operator of the test instrument 418 or determined by the test instrument itself according to methods known in the art. The controller 902 also controls the optical switch 406 to direct the OTDR test signal to a selected one of the MPO port of the output MPO adaptor 903 in order to launch an OTDR acquisition to a selected one of the optical fiber links 416 and, in the opposite direction, receive the return signal (returning from the selected optical fiber link) back to the OTDR device for acquiring a corresponding OTDR trace. Selection of the optical fibers link 416 toward which to launch the OTDR acquisition may be input by the operator of the test instrument 418 or may be automated by the controller 902. In one embodiment, the controller 902 may successively launch OTDR acquisitions toward each optical fiber links 416 automatically. The OTDR traces acquired from the optical fiber links 416 are then received and analyzed by the analyzing module 910.

The analyzing module 910 may be embodied by hardware and software and, as mentioned hereinabove, may be integral, partially external or totally external to the OTDR device 404 used to perform the acquisitions. The analyzing module 910 performs the calculations necessary to characterize events along one of the optical fiber links 416 and to identify the fiber arrangement of the cable link under test 402, comprised in the optical fiber links 416. The optical fiber links 416 typically each comprise one or more events located at undetermined positions therealong. The analyzing module 910 identifies and characterizes the events along each tested optical fiber link 416 through analysis of one or more OTDR traces and identifies the fiber arrangement of the cable link under test 402. The analyzing module 910 typically comprises a single-end analyzing module 930, a fiber arrangement analyzing module 932, an OTDR acquisition pairing module 934 and a bi-directional analyzing module 936.

The single-end analyzing module 930 first performs single-end analysis of each OTDR acquisition. Events along the fiber link under test 416 are identified on the corresponding OTDR trace(s) and a list of events is created. Identification of the events may be made according to their locations, i.e. the distance along the optical fiber link at which the event is identified. It is common in the art to identify events on an OTDR trace 200 by analyzing the OTDR trace to identify a localized drop in the backreflected/backscattered light and/or a reflection peak. The presence of one or the other will generally be interpreted as an event. It is also common in the art to characterize events along an optical fiber link by attributing values to three different parameters: the location of the event along the optical fiber link, the insertion loss associated with the event and the reflectance at the event (when present). Depending on the circumstances, one or a plurality of these parameters may be evaluated for a given event. It is also common to characterize optical fiber segments between the identified events by attributing a value of an attenuation parameter thereto.

TABLE 6

Exemplary list of events

| | Location (m) | Insertion loss (dB) | Reflectance (dB) | Attenuation (dB/km) | Event analysis | Detected signature |
|---|---|---|---|---|---|---|
| | | | | 0.15 | | |
| Event 1 | 10 | 0.4 | −50 | | $E1_X$ | E |
| | | | | 0.15 | $L_X = 18$ | |
| Event 2 | 28 | 0.5 | −55 | | $E2_X$ | |
| | | | | 0.15 | | |
| Event 3 | 52 | 0.1 | −60 | | | |
| | | | | 0.15 | Launch cable | |
| Event 4 | 72 | 0.2 | −45 | | | |
| ... | | | | 0.15 | Cable link under test | |

TABLE 6-continued

Exemplary list of events

| | Location (m) | Insertion loss (dB) | Reflectance (dB) | Attenuation (dB/km) | Event analysis | Detected signature |
|---|---|---|---|---|---|---|
| Event 5 | 290 | 0.5 | −51 | | | |
| | | | | 0.15 | Receive cable | |
| Event 6 | 310 | 0.35 | −62 | | | |
| | | | | 0.15 | Loopback | |
| Event 7 | 330 | 0.4 | −58 | | | |
| | | | | 0.15 | Receive cable | |
| Event 8 | 350 | 0.45 | −53 | | | |
| ... | | | | 0.15 | Cable link under test | |
| Event 9 | 568 | 0.35 | −45 | | | |
| | | | | 0.15 | Launch cable | |
| Event 10 | 588 | 0.3 | −49 | | | |
| | | | | 0.15 | | |
| Event 11 | 608 | 0.4 | −51 | | $E2_X$ | |
| | | | | 0.15 | $L_X = 12$ | B |
| Event 12 | 620 | 0.25 | −52 | | $E1_X$ | |
| | | | | 0.15 | | |

The single-end analyzing module 930 typically stores the single-end characterization result and the OTDR traces as a single-end OTDR measurement file or table. Each single-end OTDR measurement is tagged or otherwise associated with the specific port as selected by the optical switch 406. The listed events should include optical signatures generated by event feature of the signature array 408. In the case of the signature array 500 of FIG. 5A, the event features should generate two events mutually separated by optical distance $L_X$ defining optical signature X. An optical signature should normally be found at both the beginning and the end of each OTDR acquisition. Table 6 shows an exemplary list of events as could be extracted from a single-end analysis performed on a sample OTDR acquisition undertaken with the system of FIG. 4, the signature array 500 of FIG. 5A and the loopback device 600 of FIG. 6A, toward port 5 of the output MPO adaptor 903.

The fiber arrangement analyzing module 932 identifies the fiber arrangement in the cable link 402 from OTDR acquisitions. For this purpose, a characterization of the signature array 408 and its optical signatures, as well as a characterization of the loopback arrangement of the loopback device 414 may be either provided to the analyzing module 910 (as a file saved in memory for example) or predetermined by the test instrument 418 though a prior calibration. For example, a characterization of the loopback arrangement may also be provided as a table listing the combinations of signatures corresponding to each possible fiber arrangement (a table similar to the table of FIG. 6B).

The possible optical signatures being known, the fiber arrangement analyzing module 932 detects, within the list of events, events corresponding to an optical signature and determines which optical signature they correspond to. In the case of the example of Table 6, the fiber arrangement analyzing module 932 detects signature E at the beginning of the OTDR acquisition and signature B at the end. From the characterization of the loopback arrangement (see FIG. 6B for example), it may then identify the fiber arrangement. In the case of the example of Table 6, the cable type unambiguously corresponds to a Type A cable, i.e. key inversion without duplex pair twists. Of course, as discussed hereinbefore, in some embodiments, more than one OTDR acquisition may be required to unambiguously identify the fiber arrangement. The determined fiber arrangement may be displayed on screen or otherwise output to an operator of the test instrument 418, in the form of an identified cable Type or equivalent cable Type of example. The determined fiber arrangement may also be compared to an expected fiber arrangement received as an input or otherwise provided to the test instrument. Any discrepancy between the expected and the determined fiber arrangement may then be flagged and displayed on screen or otherwise output to the operator. Furthermore, if the combination of signatures does not match any known optical fiber arrangement, the fiber arrangement analyzing module 932 may flag this situation and display a warning on screen or otherwise output a warning to the operator.

Then, in addition to identifying the fiber arrangement, it may be required to characterize each optical fiber link of the cable link under test 402. In this respect, OTDR acquisitions should be performed for each ports of the output MPO port 903.

The OTDR acquisitions pairing module 934 then pairs OTDR acquisitions performed onto optical fibers that are looped back together at the loopback device. In one embodiment, the pairing is based on the optical signatures detected on each OTDR acquisitions. For example, the OTDR acquisition having signature E at the beginning and signature B at the end is paired with the OTDR acquisition having signature B at the beginning and signature E at the end. In another embodiment, once the cable type is identified, the pairing is based on the combination table corresponding to the identified cable type. In this case, the OTDR acquisition performed toward port 5 is simply paired with the OTDR acquisition performed toward port 2, based on the table of FIG. 6B.

Once the OTDR acquisitions are paired, the bi-directional analyzing module 936 performs bi-directional analysis of the paired OTDR acquisitions as known in the art, based for example on the previously generated and stored single-end OTDR measurement files or table. In this specific embodiment, events of the forward-direction list of events are matched with events of the backward-direction list of events using their respective location along the optical fiber link 416 and bi-directional insertion losses and reflectances are calculated for events of the list, using single-end insertion loss and reflectance values stored in single-end OTDR measurement files or tables. Actual bidirectional attenuation values may also be calculated for each optical fiber segment, from "apparent" single-end attenuation values. Of course, other ways known in the art to conduct bi-directional analysis may be employed. Then, knowing the lengths of the launch and receive cables, as well as that of the signature array and the loopback device, characterization of the cable link 402 alone may be extracted from the bi-directional OTDR analysis results and tier 2 characterization of the cable link 402 be completed. It is noted that lengths of the launch and receive cables may be determined from a prior reference step, may be input by the operator or may be determined by the test instrument from the actual OTDR acquisitions for example.

Single-end and bi-directional analysis results may be saved in memory as a file or may be graphical displayed on screen, printed or the like in the form of an event table, a graphical link element view and/or a loss and reflectance profile view, or in any other form. In the illustrated example of the test instrument 418, the results are shown on the display 912 which may either be integral or external to the test instrument 418. OTDR analysis results may also be further processed by testing them against pass/fail criterions for example.

It will be readily understood that several variants of OTDR exist and may be devised, and that the use of this designation herein in not meant to limit the scope of the present specification to any of such variants. One skilled in the art will also understand that other optical components may be added to the OTDR device 404 for referencing purposes for example. For instance, in some embodiments (not illustrated), an internal reference reflector may be connected to a fourth port of the directional coupler 108. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.), commonly owned by the applicant).

One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace. It will also be understood that other factors may need to be controlled during the light acquisitions or from one light acquisition to the next, such as gain settings, pulse power, etc. as is well known to those skilled in the art.

Furthermore, the described systems and methods may also involve performing additional light acquisitions under varying acquisition conditions. For example, the systems and methods described herein may further employ multi-pulsewidth bi-directional OTDR analysis, as described in US Application Publication no. US2014/0198311A1 to L'Heureux et al. dated Jul. 17, 2014 and which is commonly owned by Applicant and hereby incorporated by reference.

Referencing

As mentioned hereinbefore, a predetermined MPO connection convention should be respected when interconnecting the OTDR device 404, the optical switch 406, the signature array 408 (the later three being herein integrated in the test instrument 418), the launch cable 410, the cable link under test 403, the receive cable 412 and the loopback device 414 in order to allow proper fiber arrangement determination on the cable link under test 402. This convention may be either verified or determined via a reference step that is optionally conducted before performing OTDR characterization of the cable link under test 403.

In order to perform this reference step, in one embodiment, a reference link is made by directly interconnecting the OTDR device 404, the optical switch 406, the signature array 408, the launch cable 410, the receive cable 412 and the loopback device 414 (i.e. the test system 400 of FIG. 4, with the cable link under test 402 and one MPO adapter 420 missing). OTDR acquisitions are then undertaken on the reference link by successively launching one or more OTDR acquisitions toward at least one fiber of the reference link.

For example, in the case of the embodiment of FIG. 6A, only one OTDR acquisition launched toward port 5 may be sufficient to verify the interconnection convention. If signatures E and B are respectively detected at the beginning and the end of the OTDR acquisition, the interconnection convention is respected.

However, in order to provide a complete characterization of the OTDR system 400, including the optical signatures of the signature array 408 and/or the loopback arrangement of the loopback device 414, OTDR acquisitions should be launched successively to each port of the optical switch 406. The test instrument may then determine or verify the MPO convention from these OTDR acquisitions.

The same OTDR acquisitions may also be used by the test instrument to determine the lengths of the optical fibers of the signature array 408, the launch and receive cables 410, 412 and the loopback device 414.

Once the reference step is completed, the launch and receive cables 410, 412 are disconnected and the cable link under test 402 with a predetermined type of MPO adapter 420 are inserted therebetween, without disconnecting the other parts of the OTDR system 400.

Duplex Optical Cabling

It should be noted that the OTDR system 400 of FIG. 4 may also be employed to verify fiber polarity in combinations of MPO cables, optical fiber transition modules and duplex cables. In this case though, it is not sufficient to simply identify the presence of MPO key inversion and MPO duplex pair twists as a whole (as described hereinbefore with reference to FIGS. 6, 7 and 8) in order to unambiguously identify the fiber arrangement. In this case, because each individual duplex cable could be twisted, OTDR acquisitions need to be undertaken for each individual optical fiber link 416 and each optical signature of the signature array 408 should be unique. Recognition of the optical signatures on the OTDR acquisitions then allows polarity verification and fiber arrangement identification.

Universal Polarity Management Method

It should be noted that the OTDR system 400 of FIG. 4 may also be employed to verify proper utilization of proprietary MPO cables or optical fiber transition modules, such as that of the Universal Polarity Management Method by Corning™. For example, if the cable link under test 402 employs the Universal Polarity Management Method by Corning™, the fiber arrangement analysis should find no key inversions and pair twists (as in the combination of a Type B cable, a Type A adaptor and a Type C cable). However, should a conventional optical transition module (as defined in the TIA/EIA-568-0.3 Standard) be mistakenly connected instead of a Corning™ optical fiber transition module for example, the OTDR system 400 of FIG. 4 would identify that the fiber arrangement does not follow any known convention and therefore display an appropriate warning to the operator. The OTDR system 400 may also further be able to identify some problematic connections such as the use of a Corning™ optical fiber transition module with a conventional optical transition module, using signatures identified in the acquired OTDR traces, and indicate this diagnostic on screen for example.

Multiple Output Ports

Figure 10:
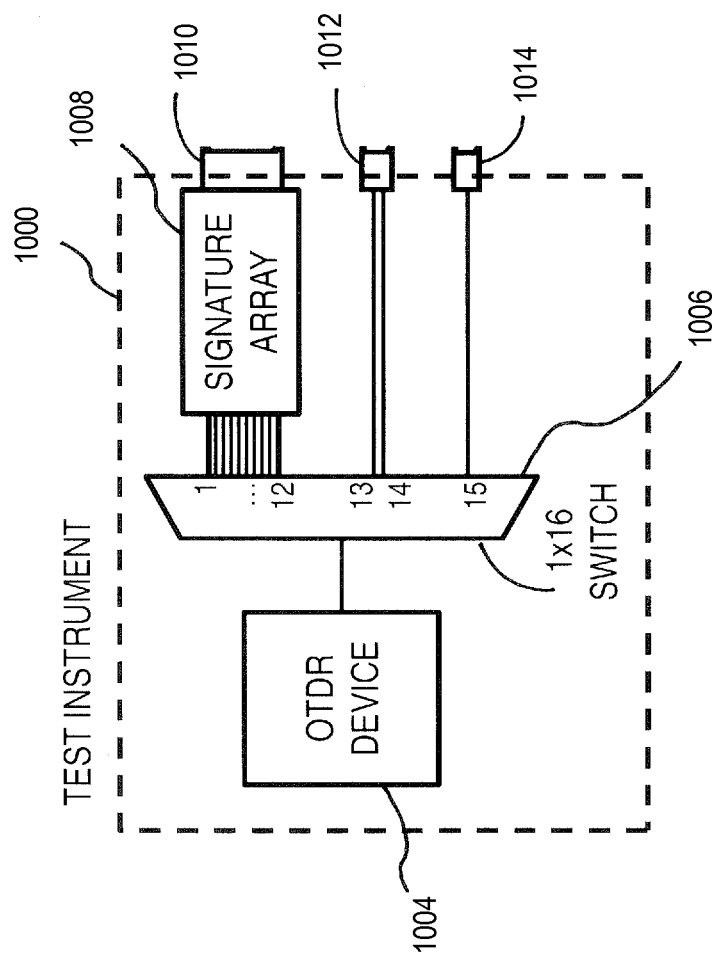
FIG. 10 is a block diagram illustrating a test instrument in accordance with an another embodiment which employs a 1×16 switch to connect the OTDR device to a plurality of multi-fiber output ports of the test instrument.

FIG. 10 shows a further embodiment of a test instrument 1000 which is based on the test instrument 418 of FIG. 9 but is modified to offer a plurality of output ports dedicated to perform OTDR testing on different multi-fiber or simplex cables. As the test instrument 418, the test instrument 1000 comprises an OTDR device 1004, an optical switch 1006 and a signature array 1008. However, the optical switch is a 1×16 optical switch 1106 that couples the OTDR device 1004 to a plurality of output ports 1010, 1012, 1014 of the test instrument 1000. For instance, a 1×12 MPO connector 1010 may be coupled to ports 1 to 12 of the optical switch 1006 (or any other 12 ports), a duplex connector 1012 to ports 13, 14 (or any other 2 ports) and a simplex connector to port 15 (or any other single port). Port 16 may either remain unused on be coupled to a second simplex connector for example. In the illustrated embodiment, the signature array 1008 is inserted between ports 1 to 12 of the optical switch 1006 and the MPO connector 1010 but it will be understood that, in other embodiments, the signature array 1008 is external to the test instrument 1000. In this case, twelve ports of the optical switch are directly connected to the MPO connector 1010.

Using this configuration, the test instrument offers a dedicated output port for each different type of cables that can be tested, e.g. MPO cables, duplex cables and simplex cables.

Signatures at Far End

Figure 11:
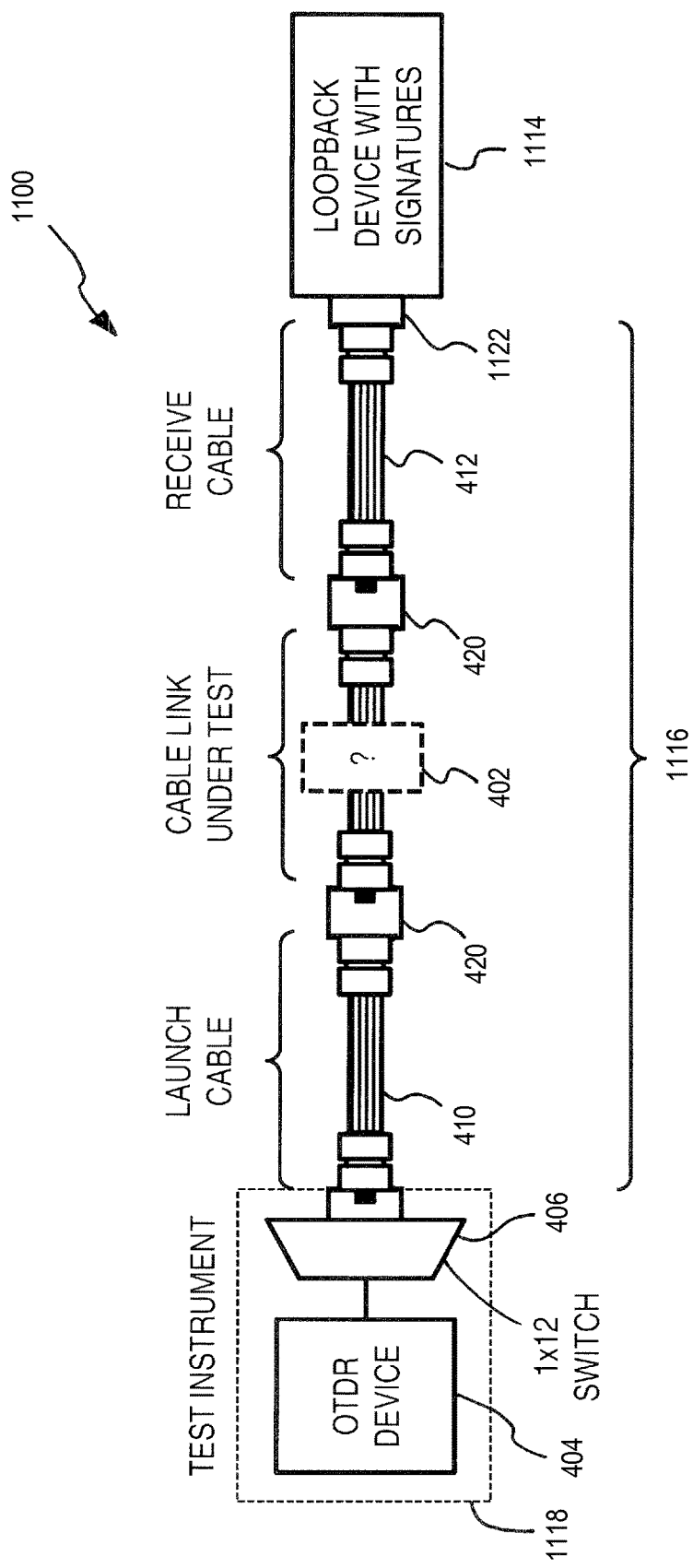
FIG. 11 is a schematic illustrating an optical reflectometry system for identifying a fiber arrangement in a multi-fiber cable link, in accordance with another embodiment in which the signature array is disposed at the far end of the tested cable link.

FIG. 11 shows another embodiment of an OTDR system 1100 for identifying a fiber arrangement in a 1×12 MPO cable link 402 comprising a plurality (in this case 1×12) of optical fiber links. The OTDR system 1100 differs from that of FIG. 4 in that the signature array is placed at the far end of the cable link under test 402, instead of the near end. In this embodiment, the test instrument 1118 consists of the OTDR acquisition device 404 and the optical switch 406. The OTDR system 1100 further comprises a launch cable 410 to be connected between the test instrument 1118 and the near end of the MPO cable link under test 402, a receive cable 412 and a loopback device 1114, the receive cable 412 to be connected between the far end of the MPO cable link under test 402 and the loopback device 1114. In this embodiment, the loopback device 1114 comprises a signature array integrated therein.

The optical signatures integrated within the loopback device 1114 may, for example, take the form of event features disposed along optical fiber loops of the loopback device 1114 and which are detectable on OTDR traces by generating detectable events such as reflective events.

In one embodiment, in order to allow for polarity testing (duplex pair twists) and key inversion identification and thereby discrimination between Type A, Type B, Type C MPO cables, the signature array within the loopback device 1114 is such that the signatures as detectable by the OTDR acquisition device 404 will be different depending on the direction in which the OTDR test signal traverses the loopback. An example of such signature array is the signature array 500 of FIG. 5A. Accordingly, in one embodiment, the loopback device 1014 comprises a concatenation of the signature array 500 of FIG. 5A and the loopback device 600 of FIG. 6A. Alternatively, the signatures may be inserted directly along the optical fiber loops.

In another embodiment, different lengths of optical fiber loops are simply employed as the optical signatures. For each optical fiber loop, two event features are produced respectively by the optical junctions at the input MPO connector 1122 of the loopback device 1114, inasmuch as the input MPO connector 1122 is a non-angled polished physical contact connector (e.g. FC/PC). The optical distance between the two event features defines the optical signature of the corresponding loop. In this case, the optical signatures are not direction dependent (of course, it will be understood that amplitudes of peaks observed in the OTDR traces will be different when measured from one end compared to the other due to optical fiber attenuation; however, the signatures are not defined or distinguished by the peak amplitudes but rather by optical distances between the peaks) and in order to allow duplex pair twists verification and hence discrimination between Type A and Type C cables, the loopback device should be such that fibers are not looped back with the other fiber of a same duplex pair. Otherwise, the same signature would appear on the OTDR trace, irrespective of the presence of duplex pair twists, e.g. whether a Type A or Type C cable is tested. Similarly, the loopback device should also not be mirror symmetric relative to a transverse line of symmetry of the fiber row, in order to allow identification of key inversions and hence discrimination between Type A and Type B cables. Then, by recognizing signatures on OTDR acquisitions performed toward the multiple optical fiber links 1116 defined by the OTDR test system 1100, it is possible to identify duplex pair twists and key inversions (and therefore the fiber arrangement) of the cable link 402 without ambiguity.

This embodiment is otherwise similar to that of FIG. 4 and like features will therefore not be repeatedly described.

It is noted that although reference is made herein to single-row multi-fiber cables and connectors, the OTDR systems described herein may be modified for other types of multi-fiber array cables and connectors including but not limited to 2×12, 6×12 and 2×16 MPO cables.

It is also noted that, although very uncommon in the industry, it is envisaged that the fiber ports not be disposed in an array on the MPO connector but rather employ any arbitrary disposition.

As mentioned hereinabove, bi-directional OTDR analysis is currently recommended by standard organizations for characterizing insertion loss in singlemode optical fiber links. It should however be understood that at least some of the systems and methods described herein may also be applied to characterize multimode optical fiber links.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated herein is thus only provided for efficiency of teaching the described embodiment.

The embodiments described above are intended to be exemplary only. The scope of the invention is therefore intended to be limited solely by the appended claims.

What is claimed is:

1. An optical reflectometry method for identifying a fiber arrangement in a multi-fiber cable link comprising a number of optical fiber links each connected between a front multi-fiber connector, at a near end of said cable link, and an end multi-fiber connector, at a far end, according to said fiber arrangement, the method comprising:
   launching optical reflectometry acquisitions toward a plurality of said optical fiber links, each one of said optical reflectometry acquisitions being performed onto a single pair of a set of pairs of said optical fiber links, the optical fiber links in each pair being looped back together according to a loopback arrangement of a loopback device coupled to said multi-fiber cable link at said far end, wherein no more than two optical fiber links of said multi-fiber cable link are looped together;
   detecting at least one optical signature of an array of signatures coupled to said cable link at one of said far end and said near end on at least two of said optical reflectometry acquisitions;
   identifying a fiber arrangement in said multi-fiber cable link from the detected signature in said optical reflectometry acquisitions, from a characterization of the loopback arrangement of the loopback device and from a characterization of said array of signatures;
   using the detected at least one optical signature, pairing optical reflectometry acquisitions that are performed toward optical fiber links that are looped back together; and
   performing a bidirectional optical reflectometry analysis using the paired optical reflectometry acquisitions to characterize said optical fiber links that are looped back together.

2. The method as claimed in claim 1, wherein said launching optical reflectometry acquisitions comprises controlling an optical switch to successively direct a test signal to said plurality of said optical fiber links.

3. The method as claimed in claim 1, further comprising:
   pairing optical reflectometry acquisitions that are performed onto a same pair of said pairs of optical fiber links that are looped back together; and
   performing a bidirectional optical reflectometry analysis using the paired optical reflectometry acquisitions to characterize each pair of said set of pairs of optical fiber links that are looped back together.

4. The method as claimed in claim 3, wherein said detecting comprises detecting at least one optical signature of an array of signatures coupled to said far end of said cable link and wherein each of said optical signature as detectable by the optical reflectometry acquisition device is dependent upon the direction in which a test signal propagates in the corresponding optical fiber path.

5. The method as claimed in claim 1, wherein said detecting comprises detecting at least one optical signature of an array of signatures coupled to said near end of said cable; wherein at least two optical fiber loops of said loopback device each couples optical fiber ports that do not pertain to a same pair of an inclusive set of distinct pairs of adjacent optical fiber ports; wherein said at least two optical fiber loops do not couple optical ports of two same pairs of said set; and wherein a loopback arrangement of said loopback device is not mirror symmetric relative to a transverse line of symmetry of an optical fiber port arrangement of said end multi-fiber connector.

6. The method as claimed in claim 1, wherein said performing optical reflectometry acquisitions comprises performing optical time-domain reflectometry (OTDR) acquisitions.

7. The method as claimed in claim 1, wherein said detecting comprises detecting at least one optical signature of an array of signatures coupled to said far end of said cable; wherein at least two optical fiber loops of said loopback device each couples optical fiber ports that do not pertain to a same pair of an inclusive set of distinct pairs of adjacent optical fiber ports; and wherein the loopback arrangement of said loopback device is not mirror symmetric relative to a transverse line of symmetry of an optical fiber port arrangement of said end multi-fiber connector.

8. The method as claimed in claim 1, wherein launching said optical reflectometry acquisitions comprises launching optical reflectometry acquisitions toward all of said optical fiber links.

* * * * *